United States Patent
John et al.

(10) Patent No.: US 10,425,530 B2
(45) Date of Patent: *Sep. 24, 2019

(54) SYSTEM AND METHOD FOR MOBILE CORE DATA SERVICES

(71) Applicant: Futurewei Technologies, Inc., Plano, TX (US)

(72) Inventors: Kaippallimalil Mathew John, Richardson, TX (US); Frank Mademann, Teltow (DE); Fenqin Zhu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,021

(22) Filed: Sep. 25, 2017

(65) Prior Publication Data

US 2018/0013884 A1   Jan. 11, 2018

Related U.S. Application Data

(63) Continuation of application No. 15/077,675, filed on Mar. 22, 2016, now Pat. No. 9,774,729.

(Continued)

(51) Int. Cl.
*H04M 3/42* (2006.01)
*H04W 4/02* (2018.01)
(Continued)

(52) U.S. Cl.
CPC ........ *H04M 3/42144* (2013.01); *G06F 16/27* (2019.01); *H04L 65/1069* (2013.01);
(Continued)

(58) Field of Classification Search
CPC ............. H04M 3/42144; H04M 15/66; H04M 15/705; H04L 65/1069; H04W 4/24; H04W 88/00
See application file for complete search history.

(56) References Cited

U.S. PATENT DOCUMENTS 5,825,759 A    10/1998  Liu
9,774,729 B2 *  9/2017  John ..................... H04W 88/00
(Continued)

FOREIGN PATENT DOCUMENTS

CN      101964820 A    2/2011
CN      103647669 A    3/2014
(Continued)

OTHER PUBLICATIONS

Kaippallimalil, J., et al., "Data Distribution and Synchronization in Next Generation Mobile Core Network," 2015 IEEE Conference on Standards for Communications and Networking (CSCN), Oct. 28-20, 2015, pp. 288-293.

*Primary Examiner* — Brandon J Miller
(74) *Attorney, Agent, or Firm* — Slater Matsil, LLP

(57) ABSTRACT

A mobile core network with distributed data services is provided. The mobile core network includes distributed mobile cores associated with mobile data service (MDS) agents at distributed data centers. A central MDS agent is host at a central data center providing legacy mobility management entity (MME) functions. The central MDS agent and the MDS agents at the distributed data centers coordinate with each other for synchronizing context information, such as subscriber data, session context data and metrics data of UEs, so that the context information is available at the central data center and the distributed data centers when or before it is requested.

18 Claims, 14 Drawing Sheets

Related U.S. Application Data

(60) Provisional application No. 62/175,847, filed on Jun. 15, 2015, provisional application No. 62/138,887, filed on Mar. 26, 2015.

(51) Int. Cl.
| | | |
|---|---|---|
| *H04W 4/24* | (2018.01) | |
| *G06F 17/30* | (2006.01) | |
| *H04L 29/06* | (2006.01) | |
| *H04L 29/08* | (2006.01) | |
| *H04M 15/00* | (2006.01) | |
| *H04W 88/00* | (2009.01) | |
| *H04W 88/14* | (2009.01) | |
| *G06F 16/27* | (2019.01) | |

(52) U.S. Cl.
CPC ............ *H04L 67/1095* (2013.01); *H04W 4/02* (2013.01); *H04W 88/00* (2013.01); *H04M 15/66* (2013.01); *H04M 15/705* (2013.01); *H04W 4/24* (2013.01); *H04W 88/14* (2013.01)

(56) References Cited

U.S. PATENT DOCUMENTS

| | | |
|---|---|---|
| 2005/0177617 A1 | 8/2005 | Banginwar et al. |
| 2007/0299958 A1 | 12/2007 | Hu |
| 2010/0185537 A1* | 7/2010 | Bari .................. G06Q 30/04 705/34 |
| 2010/0198939 A1* | 8/2010 | Raleigh .............. H04L 41/0806 709/217 |
| 2013/0036092 A1* | 2/2013 | Lafont ............. G06F 17/30132 707/634 |
| 2014/0067759 A1 | 3/2014 | Aguilera et al. |
| 2014/0258234 A1* | 9/2014 | Michels ........... G06F 17/30309 707/638 |
| 2015/0055640 A1* | 2/2015 | Wang ................... H04W 4/005 370/338 |
| 2015/0177617 A1* | 6/2015 | Lee ....................... G03F 7/0758 430/286.1 |

FOREIGN PATENT DOCUMENTS

| | | |
|---|---|---|
| CN | 103858122 A | 6/2014 |
| EP | 1965538 A2 | 9/2008 |

\* cited by examiner

SYSTEM AND METHOD FOR MOBILE CORE DATA SERVICES

This application is a continuation of U.S. application Ser. No. 15/077,675, filed on Mar. 22, 2016, now U.S. Pat. No. 9,774,729, which claims priority to U.S. Provisional Application No. 62/175,847, filed on Jun. 15, 2015 and entitled "System and Method for Intelligent Subscriber Replication," and U.S. Provisional Application No. 62/138,887, filed on Mar. 26, 2015, and entitled "Mobile Cloud Data Services," which are hereby incorporated by reference herein as if reproduced in their entirety.

TECHNICAL FIELD

The present invention relates generally to wireless communications, and in particular embodiments, to techniques and mechanisms for mobile core data services.

BACKGROUND

Next generation networks (i.e., 5G networks) are expected to support services ranging from transactional Internet of Things (IoT) applications to low latency, high reliability applications such as cognitive assistance. Low latency applications are estimated to continue to grow and meeting low latency requirements is becoming critical for providing high-quality services. It has been understood that reducing air interface latency alone is insufficient for supporting low latency applications, and moving data and/or computing planes towards the edge or providing distributed network services is being considered as promising approaches to further reduce communication latency. However, these approaches present significant challenges to system designs and implementations in wireless communications networks, with various requirements such as scalability, compatibility, reliability and security, etc. Wireless communications systems that can meet the challenges are desired.

SUMMARY OF THE INVENTION

Technical advantages are generally achieved, by embodiments of this disclosure which describe a system and method for mobile core data services.

In accordance with an embodiment, a method for distributed synchronization in a mobile core network is provided. The method includes sending an update request, by a leader mobile core data service (MDS) agent to follower MDS agents. The update request requests the follower MDS agents to store an updated version of context information in data stores associated with the follower MDS agents. The leader MDS agent and the follower MDS agents belong to a group of MDS agents at data centers, and the update request includes a copy of the updated version of the context information. The method further includes receiving responses to the updated request from fewer than all of the follower MDS agents, and sending version information of the updated version of the context information to the follower MDS agents when the responses are from at least a threshold number of the follower MDS agents. The version information triggers the follower MDS agents to update the context information according to the updated version of the context information. A MDS agent for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
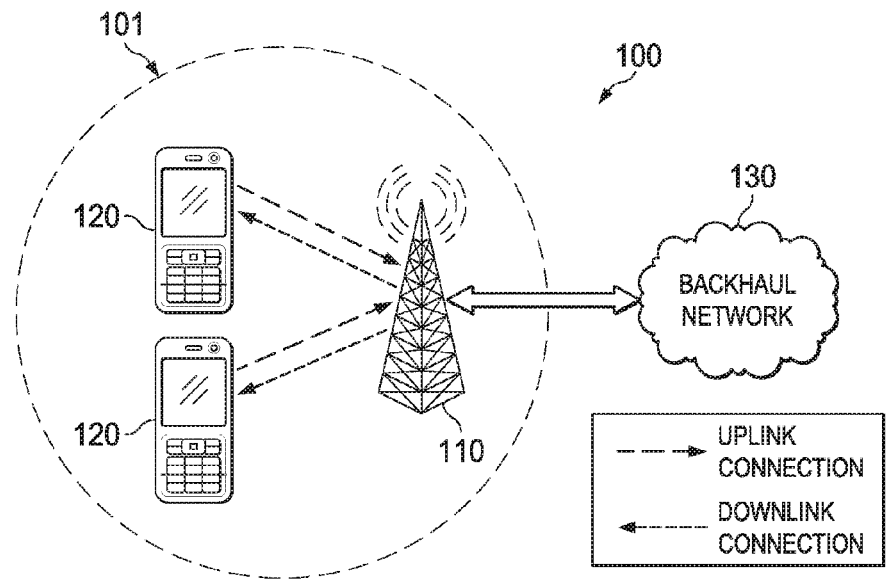
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of the present disclosure provide a mobile core network with distributed data services. In one embodiment, the mobile core network includes a central data center hosting a central mobile core data service (MDS) agent and providing legacy evolved packet core (EPC) or mobile core (MC) functions. The mobile core network also includes distributed data centers hosting distributed MCs and local MDS agents. The MDS agents, including the central MDS agent and the local MDS agents, provide storage and replication of context information across geographically distributed sites. The MDS agents form a separate tier from the control functions in a 3GPP evolved packet core network, and allows for separation of data services and independent scaling of these functionalities.

The central MDS agent and the local MDS agents coordinate with each other to pre-fetch context information of UEs, such that the context information is available prior to being requested. For example, a distributed MC at a distributed data center may access locally context information that is pre-fetched by a local MDS agent at the distributed data center, for handling a UE session. The context information may include subscriber data, session context data, and metrics data of UE sessions.

In some embodiments, the central MDS agent and the local MDS agents are configured to synchronize context information with one other. For example, the central MDS agent may synchronize subscriber data with the local MDS agents. In this case, the central MDS agent operates as a leader and the local MDS agents operate as followers. In another embodiment, a local MDS agent may synchronize session context data and metrics data with other local MDS agents and/or the central MDS agent. In this case, the local MDS agent operates as a leader and the other local MDS agents and the central MDS agent operate as followers. In some embodiments, a leader may send an update request to followers, requesting the followers to store an updated version of context information. The leader may receive responses to the update request from the followers, and send version information of the updated version of the context information to the followers. The version information may be a version number. The followers may determine whether the context information they are having needs to be updated based on the version information. In one embodiment, the leader may send the version information of the updated version of the context information to the followers when the received responses satisfy a pre-defined criteria. The criteria may be satisfied when a threshold number of responses are received.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

In LTE networks, base stations, such as the base station 110, form the radio access network that provides wireless access to UEs. The radio access network is further connected to an evolved packet core (EPC) or a mobile core (MC) through the backhaul network 130. By way of the EPC, UEs are connected to external networks, such as a public switched telephone network (PSTN), the Internet and other network. EPC typically includes a serving gateway (SGW), a packet data node (PDN) Gateway (PGW), a mobility management entity (MME), a home subscriber server (HSS), and other entities or functions, such as the policy and charging rules function (PCRF). The HSS is a database that contains user-related and subscriber-related information. The gateways, e.g., the Serving GW and PDN GW, manage the user plane, and transport IP data traffic between a UE and other external networks. The MME manages the control plane. It handles signaling related to mobility and security for UEs to access the radio access network. The PCRF supports traffic flow detection, charging and policy enforcement. Throughout the present disclosure, the terms of "EPC" and "MC" are used interchangeably. As used herein, a "central" entity (e.g., a central data center, a central database, a central MDS agent, etc.) refers to a central logical entity. The central logical entity may correspond to a single physical entity located in one physical location, or to multiple physical entities located in different physical locations that collectively perform functions of the central logical entity. By way of example, a central data center may include two or more separate physical data centers that are interconnected by, or otherwise from, a central cloud network, e.g., a central EPC cloud. In such an example, a central database may be partitioned between multiple physical storage locations located in the respective physical data centers. Likewise, in that example, a central MDS agent may correspond to different MDS agents instantiated on different physical host devices (e.g., different servers) located in the respective physical data centers. In an embodiment, multiple physical entities forming the central logical entity may be transparent such that they are collectively viewed as a single entity from the perspective of the users and/or entities in the distributed data centers.

Figure 2:
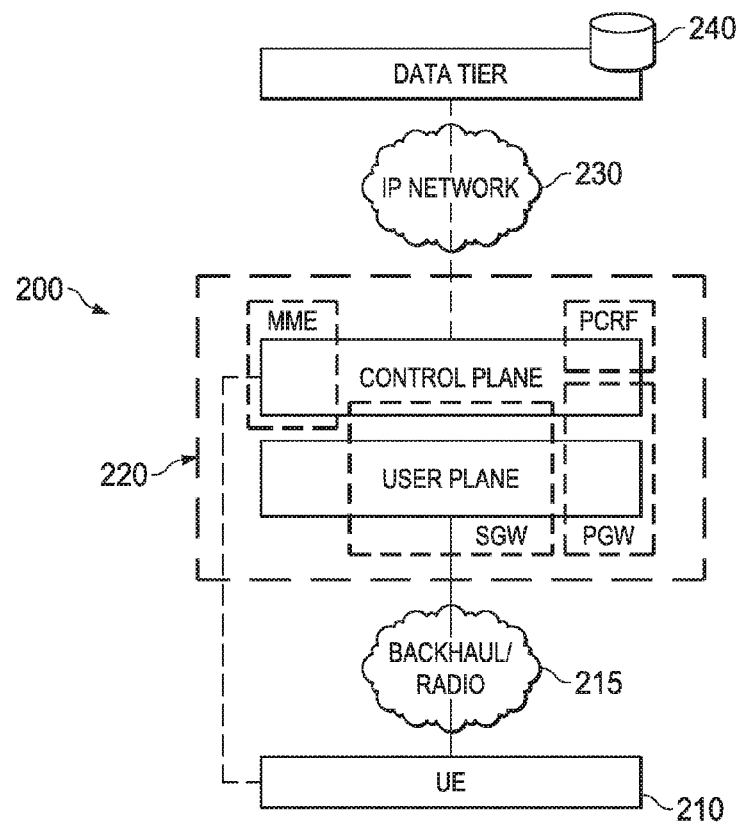
FIG. 2 illustrates a diagram of a 4G long term evolution (LTE) network architecture.

FIG. 2 illustrates a diagram of a 4G long term evolution (LTE) network architecture 200. As shown, a UE 210 connects with an EPC 220 over a backhaul and radio access network 215. The EPC 220 provides functions for a user plane, a control plane and a data tier. Entities or servers of EPC 200 that handle data, e.g., the HSS, and that handle sessions, e.g., the MME, may not be located in the same data center. As shown, the data tier of the EPC 220, which may include a HSS and a subscriber profile repository (SPR), is separate from the control and user planes. In this example, the data tier is logically or physically centralized, and data is located in a central database 240 and accessed over an IP network 230 via protocol requests. EPC entities, such as the MME and PCRF, exchange messages using protocols, such as the Diameter protocol, and the general packet radio service (GPRS) tunneling protocol (GTP), with each other to take actions and exchange state information. When data is processed remotely, protocol routers, such as the Diameter Routing Agents (DRAs), allow distributed entities to exchange signaling messages over the network. Signaling routing networks with DRAs and other protocol routers may operate with redundant nodes and paths to ensure that control signaling always available.

Figure 3:
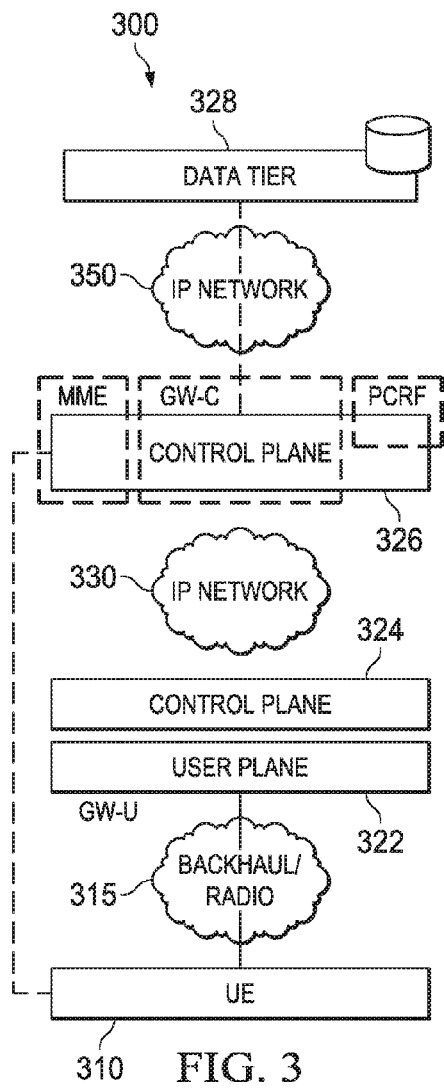
FIG. 3 illustrates a diagram of an embodiment wireless network architecture with distributed user plane and control plane.

In the next generation/5G networks, where a wide range of services need to be supported, such as transactional Internet of Things (IoT) applications and low latency and high reliability applications, it may be helpful to distribute EPC functions/components (e.g., MCs) to local data centers in order to meet the low latency and/or high reliability demands of some network services/applications. FIG. 3 illustrates a diagram of an embodiment wireless network architecture 300, where the user plane and control plane of the EPC are distributed in a local data center. As shown, a UE 310 connects with an EPC over a backhaul and radio network 315. In this example, user plane 322 and control plane are distributed, with the user plane 322 moved closer to the radio access network. A distributed control plane 324 is placed closer to the radio access network and a central control plane 326 provides functions such as MME, GWC and PCRF. The central control plane 326 may be deployed in the same or different central data center as a central data tier 328. Communication between the distributed control planes 324 and the central control plane 326, and between the central control plane 326 and the central data tier 328 are performed via the IP networks 330 and 350, respectively.

As the use plane and the control plane of the MC are placed closer to the radio access network, as shown in FIG. 3, communication latency between the UE and the distributed mobile core is reduced. However, access of data for handling a UE session at the user plane 322 and the control plane 324 still needs signaling across a wide area network, such as the IP networks 330 and 350. This may cause latency, require highly reliable signaling and sufficient resources reserved for the signaling, and require routing schemes in order for data to be delivered in a timely manner.

Figure 4:
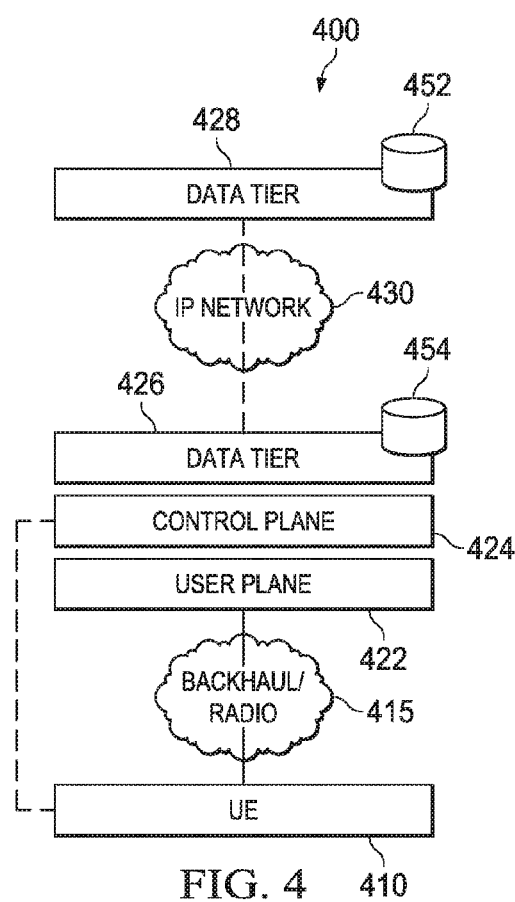
FIG. 4 illustrates a diagram of another embodiment wireless network architecture with distributed user plane, control plane and data tier.

In some embodiments, data necessary for processing a UE session may be placed closely to executing functions of the session. FIG. 4 illustrates a diagram of another embodiment network architecture 400, where user plane, control plane and data tier of the EPC are distributed. As shown, a UE 410 connects with an EPC over a backhaul and radio access network 415. In this example, user plane 422 and control plane 424 are moved closer to the radio interface. Data tier is distributed in such a way that a distributed data tier 426 is deployed with the user plane 422 and control plane 424, and a central data tier 428 is deployed separately from the distributed data tier 426. The distributed data tier 426, the user plane 422 and control plane 424 may form a distributed MC communicating with the central data tier 428 through an IP network 430. The distributed data tier 426 may be associated with a database or data store 454, and the central data tier 428 may be associated with a central database or data store 452. The data tier may be distributed geographically. Data may be synchronized between the central data tier 428 and the distributed data tier 426, and distributed computing and consensus management mechanisms may be used to communicate and manage data between the data tiers.

Figure 5:
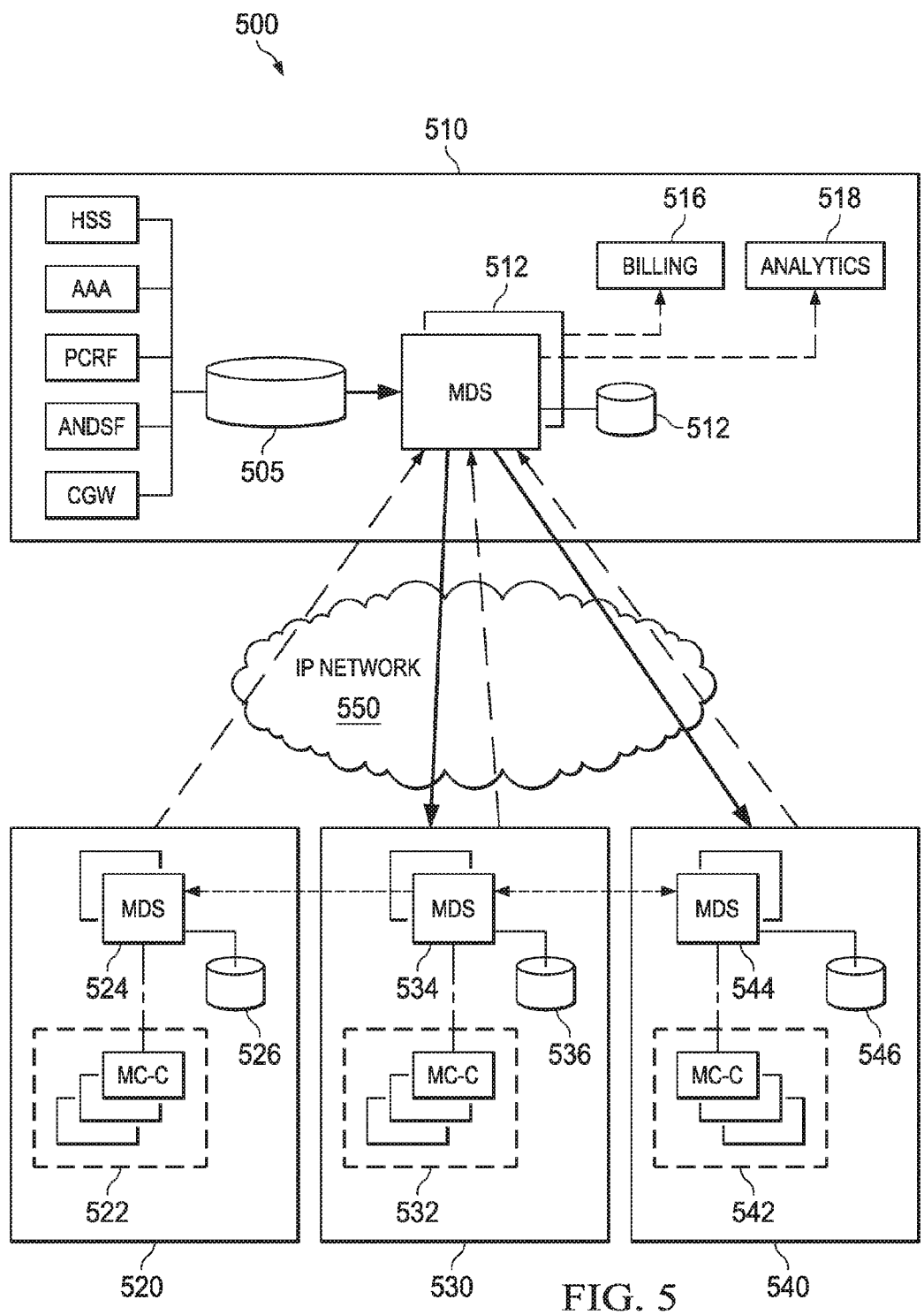
FIG. 5 illustrates a diagram of an embodiment wireless communications system with distributed data services.

FIG. 5 illustrates a diagram of an embodiment 3rd generation partnership project (3GPP) communications system 500 with distributed data services. As shown, the system 500 includes a central data center for a region, i.e., a regional data center 510, and distributed (or local) data centers 520, 530 and 540 that host distributed MCs handling UE sessions. The regional data center 510 and the distributed data centers 520, 530 and 540 are connected by a wide area IP network 550. The regional data center 510 hosts EPC/MC functions including HSS, authentication, authorization and accounting (AAA), PCRF, access network discovery and selection function (ANDSF), charging gateway (CGW), and other legacy EPC/MC functions. The distributed data centers 520, 530 and 540 may be referred to as distributed MC sites hosting distributed MC functions, and are geographically closer to the radio access network interface. FIG. 5 illustrates that each of the distributed data centers 520, 530 and 540 hosts a MC control (MC-C) entity, namely, MC-C entities 522, 532 and 543. Each of the MC-C entity provides MC control plane functions. The MC functions at the regional data center and the distributed data centers may be implemented by virtual machines, and may be implemented in a central or distributed manner. In one embodiment, services/sessions that are not latency sensitive (e.g., massive IoT) may be served by network entities from any of the regional data center 510 or the distributed data centers. Requests for applications that are latency sensitive, e.g., for cognitive assistance or for access of a content distribution network (CDN), maybe served by one of the distributed data centers. The system 500 may include a number of distributed data centers hosting distributed MC functions, and the distributed data centers form a cluster. Thus, mobility and session handling functions are distributed at distributed data centers in the cluster, which behaves as a central mobility management entity. A distributed data center serving a UE may be referred to as a serving network of the UE, and the corresponding cluster may be referred to as a serving network cluster or a MC cluster of the UE.

In the system 500, data is replicated, distributed and synchronized through mobile core data service (MDS) agents. The MDS agents provide a service infrastructure for distributing data in the system 500 and decide where data is distributed, synchronized and handled. As shown, the regional data center 510 hosts a central MDS agent 512, the distributed data center 520 hosts a MDS agent 524, the distributed data center 530 hosts a MDS agent 534, and the distributed data center 540 hosts a MDS agent 544. The central MDS agent 512 interfaces with a main data store 505, storing, e.g., subscriber and user information, and is configured to share copies of data and update the data store 505. The central MDS agent 512 may also access a data store 514 for providing data requested by applications, such as billing application 516 and analytic application 518. The MDS agents 524, 534 and 544 are configured to locate data requested for processing a UE session or before the data is requested for processing the session, and provide and handle data related to the session. The MDS agents 524, 534 and 544 may be referred to herein as local MDS agents, since they provide data locally to the distributed MCs for handling a UE's sessions. For example, the MC-C entity 522 obtains data for handling a UE session locally from the MDS agent 524, instead of central MDS agent 512. The MC-C entity 522 may also generate data during UE session establishment, modification and deletion, and provide to the MDS agent 524 which stores the data. The MDS agents 524, 534 and 544 interface with a data store 526, 536 and 546, respectively, and are configured to replicate data from the central MDS agent 512, stream data to the central MDS agent 512, and replicate data from and to each other.

Figure 6:
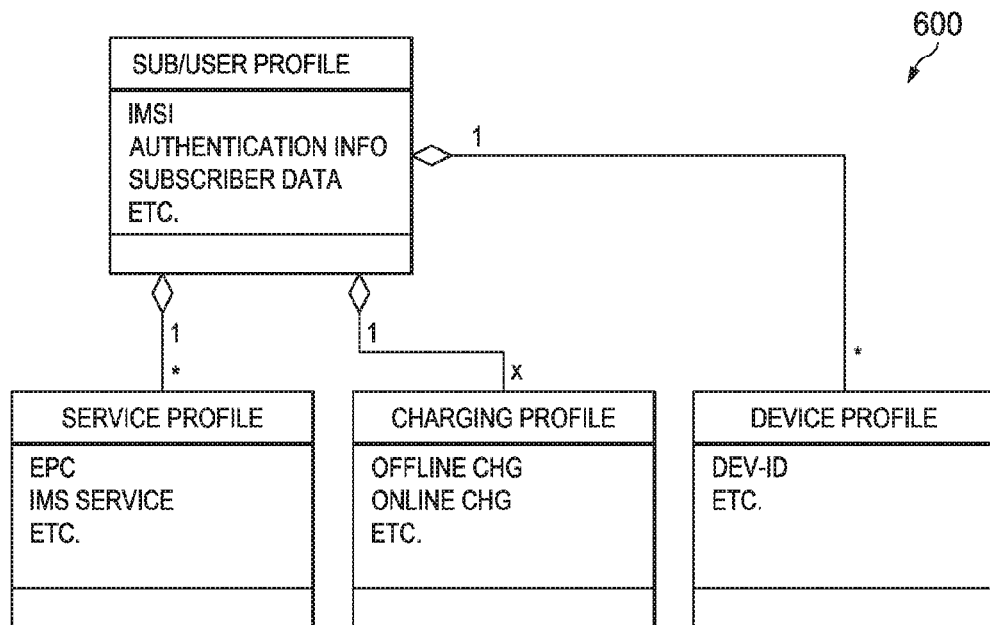
FIG. 6 illustrates a diagram of an embodiment data structure of subscriber data.

Data involved in the system 500 may include context information data, such as subscriber data. Subscriber data may include information about a subscriber's authentication, service, charging, and device, etc. FIG. 6 illustrates a diagram of an embodiment data structure 600 of subscriber data. One of ordinary skill in the art would recognize many variations and alternatives to structure the subscriber data. Because subscriber data is related to confidential and secure information, it is generally held centrally in the regional data center 510, and is provided to process requests by functions such as HSS, PCRF, and ANDSF, etc. In one embodiment, subscriber data may be stored in a central data store, and distributed and synchronized by a central MDS agent to local MDS agents. For example, the central MDS agent 512 may replicate subscriber data to a local MDS agent when the subscriber data is requested for authentication, policy handling or other purposes.

Figure 7:
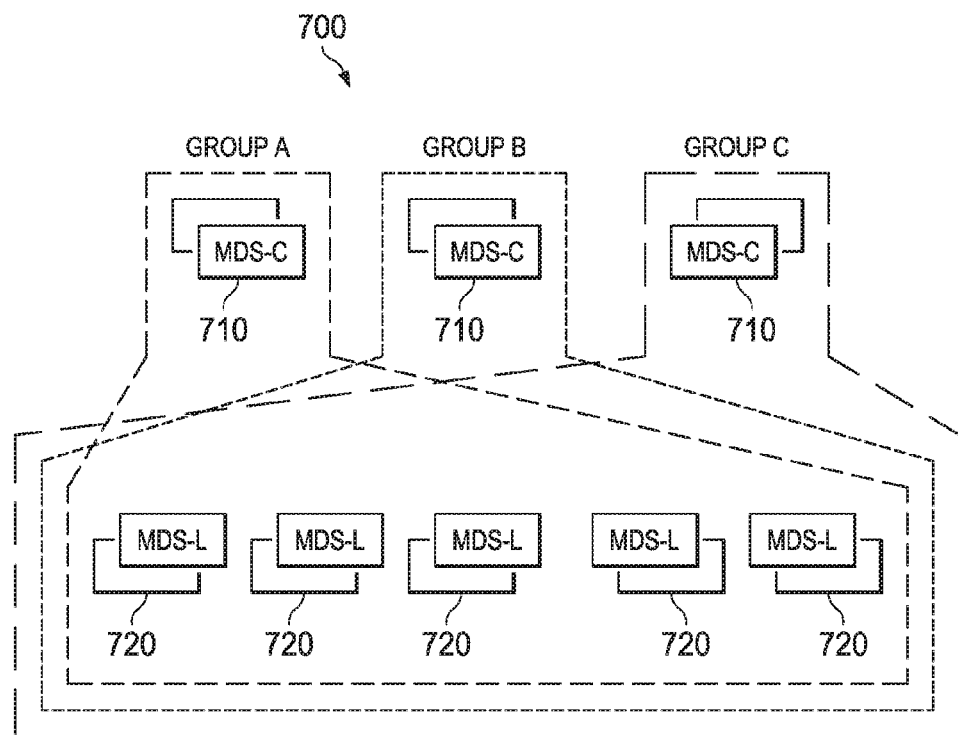
FIG. 7 illustrates a diagram for replicating subscriber data in a mobile core network.

Subscriber data may be obtained in different ways. In one embodiment, a local MDS agent may request to replicate subscriber data of a UE from a central MDS agent when or before it needs the subscriber data. In another embodiment, a local MDS agent may replicate subscriber data of a UE from another local MDS agent. In yet another embodiment, a local MDS agent may replicate subscriber data of all UEs that it might possibly serve before the subscriber data is requested. In one example, to facilitate the replication of subscriber data of all the UEs, subscriber data may be partitioned based on international mobile subscriber identity (IMSI) ranges of the UEs or other mechanisms. FIG. 7 illustrates a diagram 700 for replicating subscriber data to local MDS agents by partitioning subscriber data. In this example, subscriber data of UEs is partitioned into three groups, e.g., based on IMSI ranges of the UEs. For each group of UE subscriber data, there is an associated central MDS (MDS-C) agent 710 which copies/replicates subscriber data of UEs in the corresponding group to local MDS (MDS-L) agents 720. Each of the central MDS agents 710 is also responsible for updating changes of the subscriber data in the corresponding group to all of the local MDS agents 720. In this example, each of the central MDS agents 710 operates in a leader mode and the MDS agents 720 operate in a follower mode for synchronizing the subscriber data, because subscriber data is replicated from a central MDS agent 710 to a local MDS agent 720. If replication of subscriber data of one or more UEs on a local MDS agent 720 fails, a different central MDS agent may be elected to obtain the corresponding subscriber data, and the replication will be re-performed. In one embodiment, if a local MDS agent 720 host in a data center is unable to replicate the entire subscriber data, the MDS agent 720 may request subscriber data on demand from another MDS agent, which has the subscriber data available. For example, a MDS agent 720 may request to replicate subscriber data from a closest MDS agent, which may be a central MDS agent 710 or another local MDS agent 720.

Figure 8:
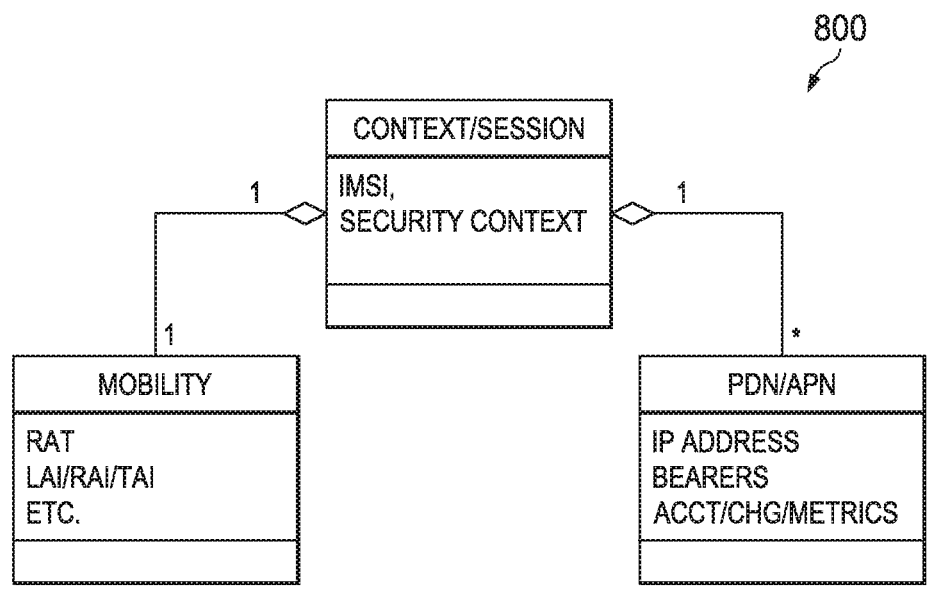
FIG. 8 illustrates a diagram of an embodiment data structure for session context and metrics data.

The context information may also include session context data and metrics data. The session context data and metrics data are data that is produced for handling or executing UE sessions. For example, session context data may include information related to an IMSI, such as location, IP address, radio access technology (RAT), services, network state or congestion information. Metrics data may include accounting and charging information used for billing and analytics, such as usage metrics and other statistics. FIG. 8 illustrates a diagram of an embodiment data structure 800 for session context and metrics data. One of ordinary skill in the art would recognize many variations and alternatives to structure the for session context and metrics data.

Figure 9:
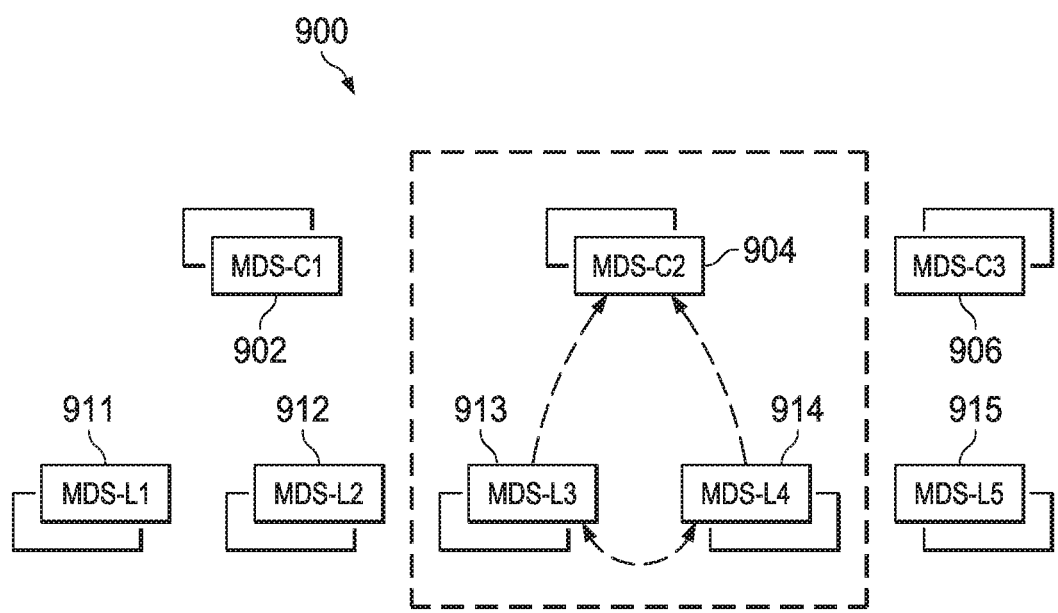
FIG. 9 illustrates a diagram of how session context data and metrics data are replicated among mobile core data service (MDS) agents in a mobile core network.

The session context and metrics data is generally high volume data and is updated frequently. The session context may be replicated among different MDS agents, and consistency and accuracy may be highly demanded. The metrics data may be streamed (or sent with a time delay) to a central MDS agent, and is consumed by applications such as charging, billing or analytics. FIG. 9 is a diagram 900 illustrating how session context data and metrics data may be replicated. The diagram 900 shows central MDS agents 902 (MDS-C1), 904 (MDS-C2) and 906 (MDS-C3), and local MDS agents 911-915 (MDS-L1, MDS-L2, MDS-L3, MDS-L4 and MDS-L5). In this example, the central MDS agent 904, the local MDS agent 913 and the local MDS agent 914 form a cluster. The local MDS agent 913 and the local MDS agent 914 are configured to stream session context and/or metrics data to the central MDS agent 904. In this case, the local MDS agent 913 or the local MDS agent 914 is a leader for replicating the data. The local MDS agent 913 and the local MDS agent 914 are also configured to replicate subscriber data and session context data to each other. This may be needed when a local MDS agent is unable to replicate data from a central MDS agent, or when a UE is moving from one local MDS agent to another. In this case, the local MDS agent that replicates data to the other is the leader.

Figure 10:
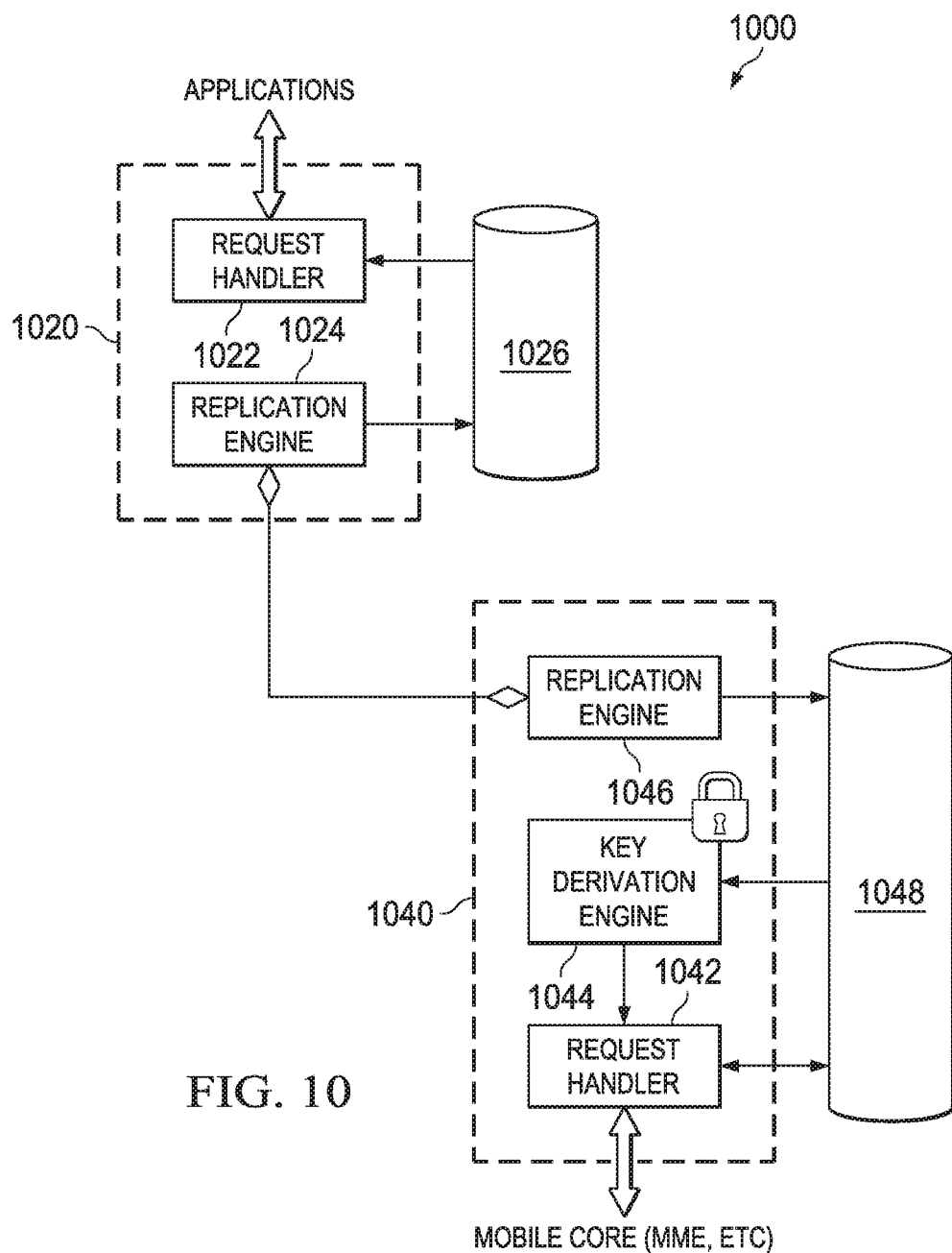
FIG. 10 illustrates a diagram of an embodiment structure for distributed MDS agents in a mobile core network.

FIG. 10 illustrates a diagram of an embodiment structure 1000 of distributed MDS agents. FIG. 10 illustrates a central MDS agent 1020 host in a central data center (not shown). The central MDS agent 1020 communicates with a local MDS agent 1040 host in a local data center (not shown). The central MDS agent 1020 includes a request handler 1022 and a replication engine 1024. The local MDS agent 1040 includes a request handler 1042, a key derivation engine 1044 and a replication engine 1046. The request handler 1022 is configured to serve data service requests from clients of the central MDS agent, such as billing, analytics or other applications, and interface with a data store 1026 to retrieve data in response to received requests. The replication engine 1024 is configured to replicate data to or from the replication engine 1046, and update data in the data store 1026. The request handler 1042 is configured to serve data service requests from clients of the local MDS agent 1040, such as a MC located with the local MDS agent 1040. The request handler 1042 interface with a data store 1048 to retrieve data in response to the requests. The replication engine 1046 is configured to replicate data from the central MDS agent 1020 and stream data to the central MDS agent 1020. The replication engine 1046 may also be configured to replicate data to or from other local MDS agents. When data requested is not available in the data store 1048, the replication engine 1046 obtains/fetches the data and stores in the data store 1048. What and where data is replicated may be set up with a control mechanism.

To enable data replication and streaming, MDS agents in a system may discover each other when the system is starting up. For example, MDS agents may discover each other using group membership dissemination and failure detection technique, with no central node (or single point of failure). Replication engines in MDS agents may exchange messages for data replication or streaming. For example, the replication engines 1024 and 1046 may exchange information including where to obtain data, form of replication, leader-follower entities and modes, etc. Different roles may be defined for replication engines to facilitate data replication and streaming. Examples of such roles are given in Table 1 below. For example, a central MDS agent may operate as a subscriber-partition-leader or a stream-aggregator. A local MDS agent may operate as a subscriber-follower, a context-leader, a subscriber-follower, or a context-follower. Data may be replicated by use of the defined roles and clusters along with access control to determine where data is replicated.

TABLE 1

| Role | Description of Role |
|---|---|
| subscriber-partition-leader | Members in this role are responsible for replicating subscriber data of IMSI in a partition group. This entity replicates to all (subscriber) followers that operate in synchronized data mode. |
| subscriber-follower | Members in this role obtain subscriber data copies and updates. A subscriber follower may operate in a mode that synchronizes all data, or per subscriber/IMSI. |
| context-leader | Members in this role are responsible for replicating session context data to context followers. The context leader also streams metrics data to a stream aggregator. |
| context-follower | Context followers are selected based on proximity, load and capability, etc., and join based on explicit signaling with a context leader. If the leader fails, a new leader is elected. |
| stream-aggregator | The stream aggregator collects streams of events, such as metrics data, corresponding to IMSIs. |

Request handlers 1022 and 1042 may exchange messages with their clients for information such as where data is kept, form of replication, leader-follower entities and modes, etc. Interactions between a request handler and its clients may use mechanisms such as request-response, publish-subscribe, message streaming. Examples of messages exchanged between a request handler and its clients include:
  Get Data—message to fetch data from the local data store
  get-subscriber-data-req (IMSI=imsi, . . . )
  get-subscriber-data-resp (IMSI=imsi, {[user profile], [sery profile], [chg profile] [dev profile] . . . })
  Set serving network
  set-serving-network (IMSI=imsi, leader=@MC-x, follower=@MC-y)
  Get serving network
  get-serving-network-req (IP-address=x, subscrid=imsi, application-id=y)
  get-serving-network-ans (serving-id=@MC-z)
  Pubsub—subscription and event notification
  subscribe (service=s; IMSI=imsi)
  Services for subscription:
    subscriber-data-change: notify with subscriber data.
    context-data: notify with context data of a user (this is at stream-aggregator).
    usage-metrics: notify with usage metrics of a user (this is at stream-aggregator).

The local MDS agent 1040 also includes a key derivation engine 1044, which is configured to provide authentication and key agreement (AKA) authentication vectors for a user/IMSI when a subscriber data request is received. The key derivation engine 1044 cannot be directly accessed by a function call in an MC, and only executes in a secure computing environment with a secure memory. Keys used for AKA, such as session keys CK and IK, may be securely transported between MDS agents participating in replication and stored securely, and cannot be accessed by any functional entities other than the key derivation engine 1044.

In some embodiment, MDS agents may replicate data for handling a UE's session before the data is requested based on mobility patterns exhibited by the UE. For example, a local MDS agent at a distributed data center may pre-fetch data of a UE so that the data is available when a MC at the distributed data center establishes a session of the UE. This may be accomplished by having an inference engine to process location changes of the UE and predict coverage areas that the UE will move in. The inference engine may make such prediction utilizing the UE's data records, information about data topology and partitions of the UE, information about the UE's previous mobility patterns, and other related information as well.

Figure 11:
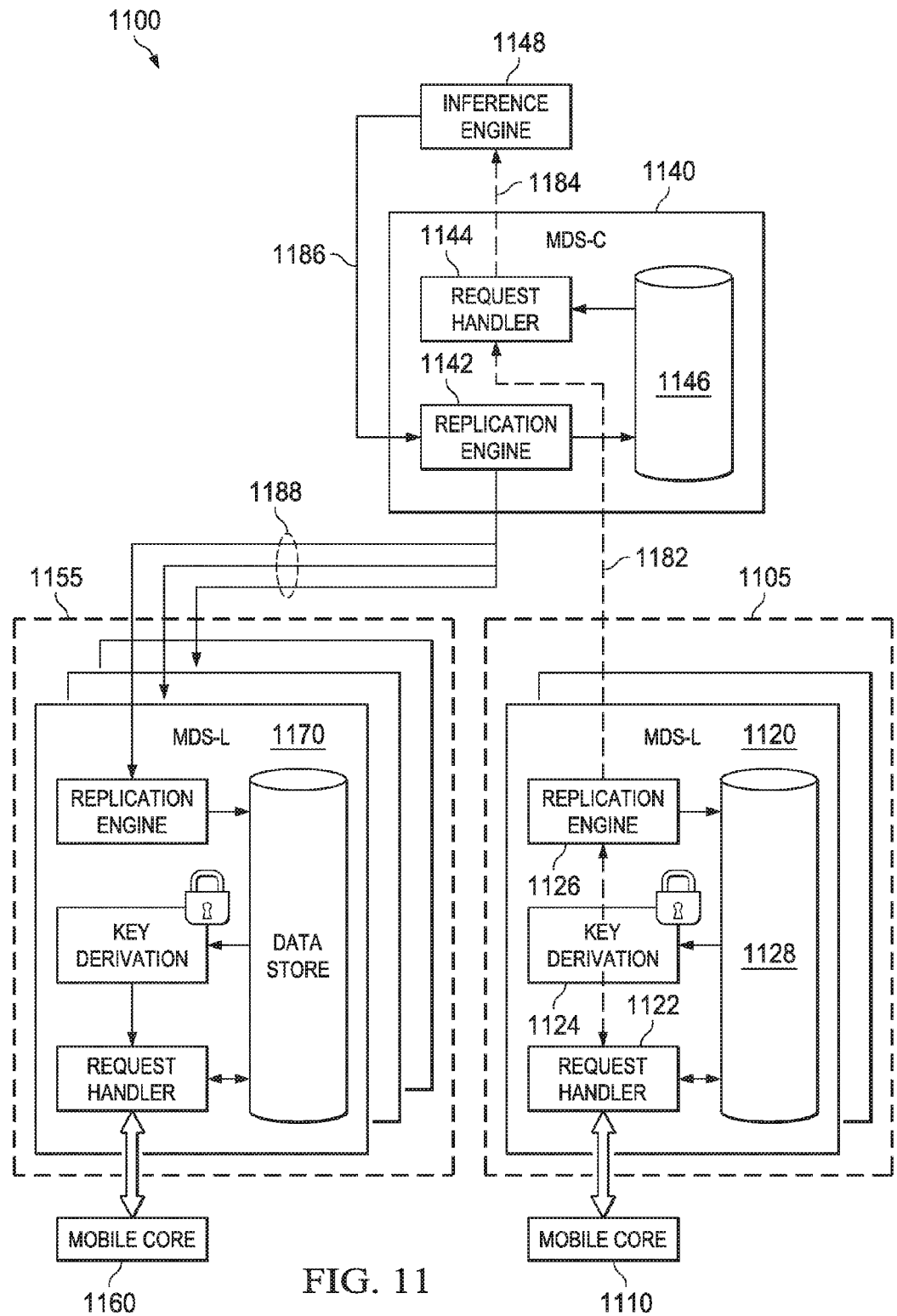
FIG. 11 illustrates a diagram of another embodiment wireless communications system.

FIG. 11 illustrates a diagram of an embodiment communications system 1100 where MDS agents coordinate with each other to pre-fetch data before the data is requested. In this example, a UE is connected with a serving network at a data center site of a replication group 1105. A replication group includes a plurality of serving networks which are grouped based on a criteria, such as geographical locations. The serving network includes a MC 1110 and a MDS agent 1120. The MC 1110 establishes a session for the UE. The MDS agent 1120 is similar to the local MDS agent 1040 in FIG. 10, and includes a request handler 1122, a key derivation engine 1124 and a replication engine 1126. The MDS agent 1120 provides data locally to the MC 1110 for serving the UE session. As the UE moves, the MC 1110 generates, during the UE session, session context and metrics data of the UE, including location data of the UE. The session context and metrics may be updated in a data store 1128 by the request handler 1122, and streamed or sent with a time delay to a central MDS agent (MDS-C) 1140 (step 1182) through the replication engine 1126. The central MDS agent 1140 is similar to the central MDS agent 1020 in FIG. 10, and includes a replication engine 1142 and a request handler 1144. The session context and metrics data may be streamed from the replication engine 1126 to the replication engine 1142, and stored in a database 1146. An inference engine 1148 may subscribe to the session context and metrics data, and other related data, such as history data or the UE, and process the data to determine mobility of the UE, such as the next possible serving network for the UE. The inference engine 1148 may obtain (or replicate), through the request handler 1144, related data for making the determination, (step 1184), and predict where the UE will move using methods, such as heuristics. When the inference engine 1148 determines that the UE will move, within a period of time, into a coverage area of another serving network that is in a replication group 1155, it informs the replication engine 1142 of the determination (step 1186). The replication engine 1142 then replicates the subscriber data and session context data of the UE to all possible serving networks belonging to the replication group 1155 (step 1188).

Figure 12:
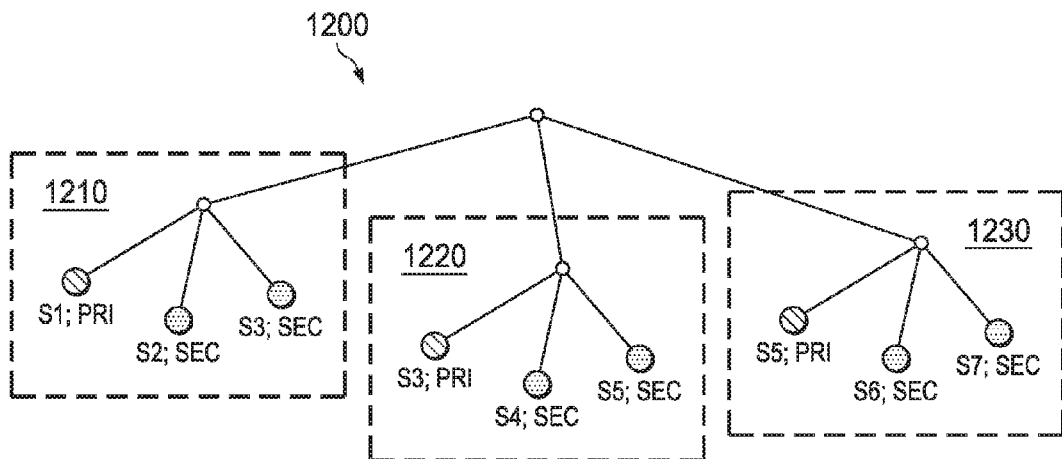
FIG. 12 illustrates a diagram of an embodiment serving network tree for locating a serving network.

When the inference engine 1148 makes an incorrect prediction, e.g., the UE moves to a serving network that is not in the replication group 1155, the subscriber data and session context data of the UE may not be available at this serving network. In this case, this serving network may obtain needed data, such as subscriber data and session context data of the UE, from another serving network. In one example, the serving network may obtain (or replicate) the UE's subscriber data and/or session context data from another serving network that is closest to it. Service discovery mechanism may be used to locate the closest serving network. FIG. 12 illustrates a diagram of an embodiment serving network tree 1200, which may be used as a data service discovery tree to locate the closest serving network. Each serving network may have such a discovery tree configured and updated dynamically. In this example, serving networks S1-S7 are partitioned into three groups 1210, 1220 and 1230 based on IMSI ranges. The IMSI partition ranges may be statically configured. Within each partition group, a primary serving network (PRI) and multiple secondary serving networks (SEC) are identified. The primary (leader) and secondary (follower) serving networks may be dynamically discovered by each other using protocol exchanges. Status of the serving networks and their roles, e.g., leader or follower, may also be exchanged. A gossip protocol may be used to exchange information about serving networks that host IMSI data corresponding to a partition (or range of IMSI), with an example data structure shown in the following.

```
<imsi-discovery>
    <imsi-range-min> min </imsi-range-min>
    <imsi-range-max> max </imsi-range-max>
    <leader> fqdn-leader </leader>
    <follower> fqdn-follower </follower>
    ...
    <follower> fqdn-follower </follower>
</imsi-discovery>
```

When a serving network starts processing for setting up a UE session (e.g., in an attach procedure of the UE), it may locate other serving networks that have the UE's subscriber data and/or session context data available by looking up the discovery tree, and its associated MDS agent may then get a copy of the data from one of the located serving networks. The serving network may send a request for searching for such serving networks, and an example of the request may be server-list=getServerforIMSI (imsi-addr). In this example, a list of serving networks in an order of distances may be returned in the "server-list". In an example, IP address of a serving network from which data will be replicated is resolved using domain name system (DNS) techniques and the fully qualified domain names (FQDNs) of the serving networks.

In some embodiments, MDS agents may coordinate with each other for data synchronization. A central MDS agent may determine that subscriber data is available for update and synchronize the subscriber data with other MDS agents. In this case, the central MDS agent is a leader, and the other MDS agents are followers. Session context data and metrics data may be generated and updated during a UE session, or when the session is changed or deleted. A local MDS agent may synchronize session context data and metrics data with a central MDS agent and/or other local MDS agents. In this case, the local MDS gent is a leader, and the central MDS agent and the other local MDS agents are followers. The leader and followers may belong to a group of MDS agents maintaining context information of UEs.

Figure 13:
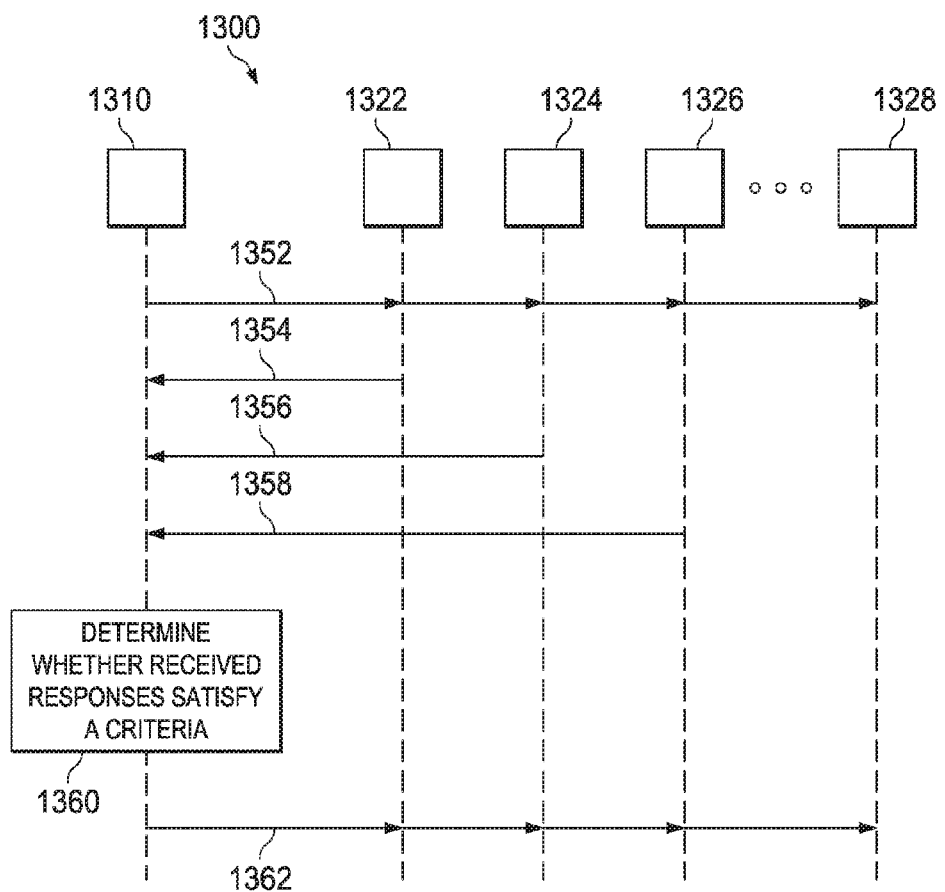
FIG. 13 illustrates a diagram of an embodiment method for synchronizing context information among MDS agents.

In some embodiments, a leader may send a request to followers for synchronizing context information, and determine whether to proceed with the synchronization based on responses to the request received from the followers. For example, the leader may determine to synchronize the context information when the received responses satisfy a pre-defined criteria. FIG. 13 illustrates a diagram of an embodiment method 1300 for synchronizing context information among MDS agents. As shown, at step 1352, a leader 1310 sends an update request to followers 1322, 1324, 1326 and 1328, requesting the followers to store an updated version of context information in data stores associated with the followers. The context information may include information corresponding to subscriber records of UEs, sessions of UEs, and/or session metrics of UEs. The update request may be send when the leader is aware of availability of the updated version of context information which needs to be synchronized with followers. As described above, the leader may be a central MDS agent or a local MDS agent. A central MDS agent, as a leader, may be notified of a change in subscriber data records and determines to send an update request for updating the change in followers. A local MDS agent at a distributed data center, as a leader, may receive a request or indication from a local MC at the distributed data center indicating that updated session context and/or metrics data is available for synchronization.

The leader 1310 may then receive responses from the followers. FIG. 13 shows that the leader 1310 receives responses from fewer than all of the followers. At step 1354, 1356 and 1358, the leader 1310 receives responses from the followers 1322, 1324 and 1326, respectively, but not from the follower 1328. This may be the case when the update request to the follower 1328 or the response from the follower 1328 is interrupted or delayed, due to a network error or network condition. At step 1360, the leader 1310 determines whether the received responses satisfy a criteria. For example, the leader 1310 may determine whether the number of responses is greater than a pre-defined threshold. Different thresholds may be defined for different leaders, followers, and context information. If the criteria is satisfied, the leader 1310 sends, at step 1362, version information of the updated version of the context information to the followers 1322, 1324, 1326 and 1328. The version information may trigger the followers to update the context information stored in their associated data stores according to the update version.

A follower may have a version of the context information stored in its associated data store. When the follower receives the version information of the updated version of the context information, such as a version number, it may check whether the version of the context information it is currently having is stale. For example, if the version number of its current context information does not match the version number of the updated version it receives, the follower may fetch and store a copy of the update version of the context information. In one embodiment, the update request sent by the leader may include a copy of the update version of the context information. Thus when the follower determines that its current version is stale, it may directly make the update without the need to further communicate with the leader for fetching the copy of the update version of the context information. The context information synchronized through the leader and the followers may then be used for setting up or changing UE sessions, or may be used by network applications, such as billing, charging, statistical analysis, and UE mobility monitoring or prediction.

In a LTE network, a globally unique temporary identity (GUTI) is allocated to a UE by the MME for unambiguously identifying each UE during signaling connections. A GUTI generally has two parts. One part is a globally unique MME ID (GUMMEI) which identifies the MME, and the other part is an MME-TMSI (M-TMSI) which identifies the UE within the MME. M-TMSI and IMSI are key identifiers for accessing information in subscriber/context information data stores. In a communications system like the system 500 in FIG. 5, where MME functions are distributed at serving networks of a serving network cluster, using the same M-TMSI will not correctly identify the UE when a UE moves between different serving networks of the same serving network cluster. A temporary key across the cluster is needed that uniquely identifies a UE with its corresponding serving network in the cluster.

In some embodiments, an M-TMSI may be generated locally for a UE at each serving network using a random number generation technique, such that the probability of duplication is low. A serving network may exchange messages with other serving networks in the same cluster to make sure the M-TMSI of a UE corresponding to the serving network is unique. The messages may be exchanged among all the serving networks or a group of serving networks in a cluster.

In some embodiments, the M-TMSI space may be partitioned among the serving networks in a cluster. A central function entity, such as a TMSI-Allocator, may be defined to allocate M-TMSI values in each partitioned space. For example, the TMSI-Allocator may run in each serving network and dynamically agree on an M-TMSI space partition scheme. The TMSI-Allocator may also be configured to handle fragmentation and garbage collect of the released M-TMSIs.

Figure 14:
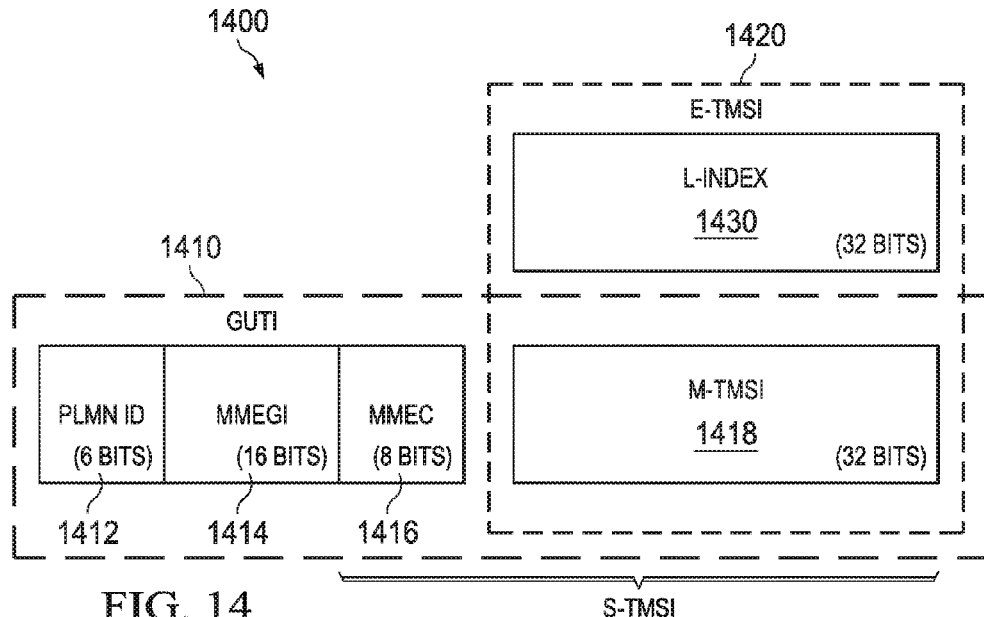
FIG. 14 illustrates a diagram of an embodiment structure of a temporary identity generated for a UE in a mobile core network.

In some embodiments, key space may be extended for generating a temporary identifier that uniquely identifies a UE in a serving network. FIG. 14 illustrates a diagram of an embodiment structure 1400 for a temporary identity of a UE. FIG. 14 shows a conventional GUTI 1410. The GUTI 1410 includes a public land mobile network identity (PLMN ID) field 1412 (6 bits), a MMEGI filed 1414 (16 bits), a MMEC field 1416 (8 bits), and an M-TMSI field 1418 (32 bits). FIG. 14 also shows an extended TMSI (E-TMSI) 1420 which is 64 bits. The E-TMSI 1420, instead of the M-TMSI 1418, will be used as the temporary identity for identifying UEs in MMEs of a cluster. The higher 32 bits of the E-TMSI 1420 is an L-index 1430 and the lower 32 bits is the M-TMSI 1418. The L-index 1430 may include a timestamp, and/or a random value. The random value may be generated randomly using any applicable techniques. In one embodiment, the random value may be a site number of a serving network, such as a data center. For example, each serving network in a cluster may be configured with a site number according to the maximum number of mobility/session management instances. The site numbers of serving networks may be used for routing connection requests for each mobility/session management instance. Timestamp and/or site number sizes can be programmed to meet the need of a cluster. The M-TMSI 1418 may be generated as a random number using conventional methods. Different seeds may be used at different serving networks for generating random numbers so that the chance of collision may be reduced. When timestamps are used to generate the L-index 1420, collisions between two serving networks in a cluster may occur only if the two serving networks generate E-TMSIs with the same M-TMSI value at exactly the same time. In one example, when a UE moves from a legacy EPC into a serving network cluster as shown in FIG. 5, a higher 32 bit value, i.e., the L-index, may be generated. The L-index, together with the M-TMSI of the UE, will be used locally for identifying the UE in a serving network of the serving network cluster. If the UE leaves the serving network, the L-index may be dropped.

Figure 15:
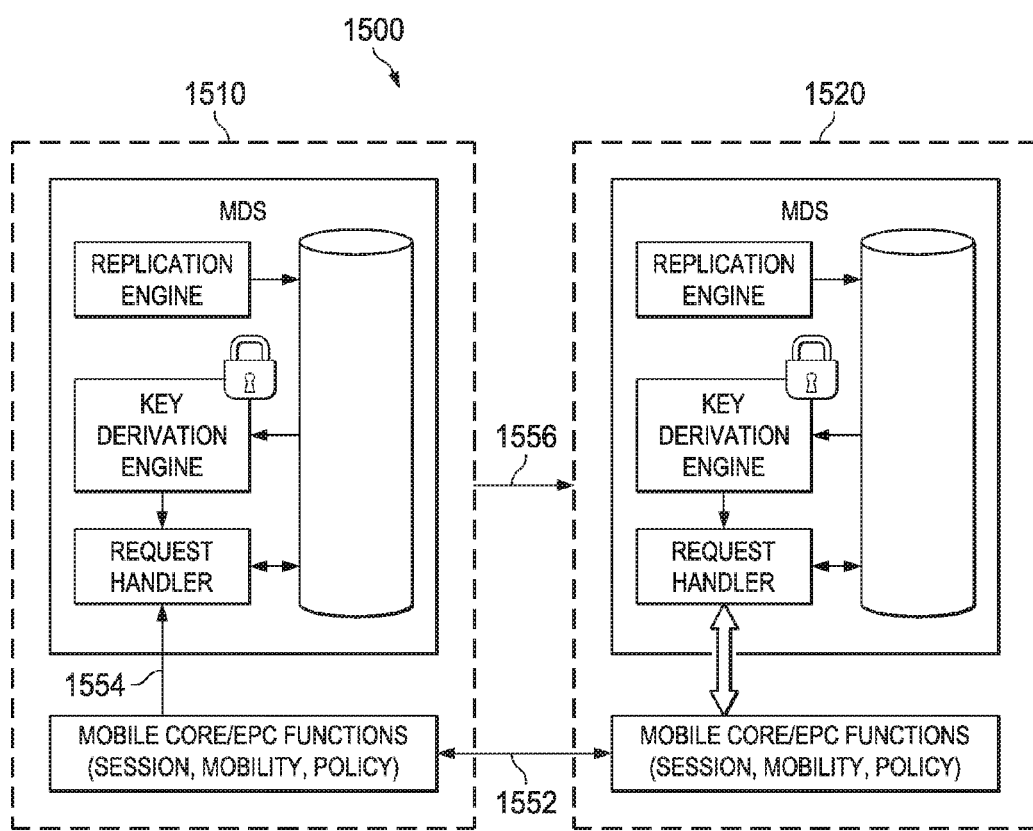
FIG. 15 illustrates a diagram of an embodiment serving network cluster.

The E-TMSI 1420 may be generated in a coordinated or an uncoordinated manner. In an uncoordinated approach, the probability of duplication is required to be very low and a high resolution timestamp may be used. A lazy mechanism may be sufficient to resolve address collisions in the E-TMSI space within a cluster when using an uncoordinated approach. For example, an audit of M-TMSIs at low operational load or at periodic intervals may be performed to check occurrence of collisions. Frequency of audits may be adjusted based on the length or resolution of the timestamp and the session setup request rate. In a coordinated approach, each generated E-TMSI 1420 may be verified to be unique across serving networks in a cluster. FIG. 15 illustrates a diagram of an embodiment serving network cluster 1500, where coordinated approach is used for generating an E-TMSI. The serving network cluster 1500 includes two serving networks 1510 and 1520. As discussed above, a serving network cluster may include any number of serving networks. The serving networks 1510 and 1520 are similar to the serving network 520, 530 or 540 in FIG. 5, and each includes a MC and a MDS agent. Each of the MDS agents is similar to the local MDS agent 1040 in FIG. 10. The serving networks 1510 and 1520 may first communicate with each for setting up a site number for each of them (step 1552). When a UE wants to connect to any of the serving networks, such as the serving network 1510, the MC in the serving network 1510 generates an E-TMSI and provides to the MDS agent in the serving network 1510 (step 1554). The serving network 1510 will then check with the serving network 1520 to determine whether the generated E-TMSI is unique across the serving network cluster 1500 (step 1556). Steps 1554 and 1556 may take place in an early stage during session processing, such that detection of duplication and regeneration of the E-TMSI may be performed before sending the E-TMSI to the UE.

Figure 16:
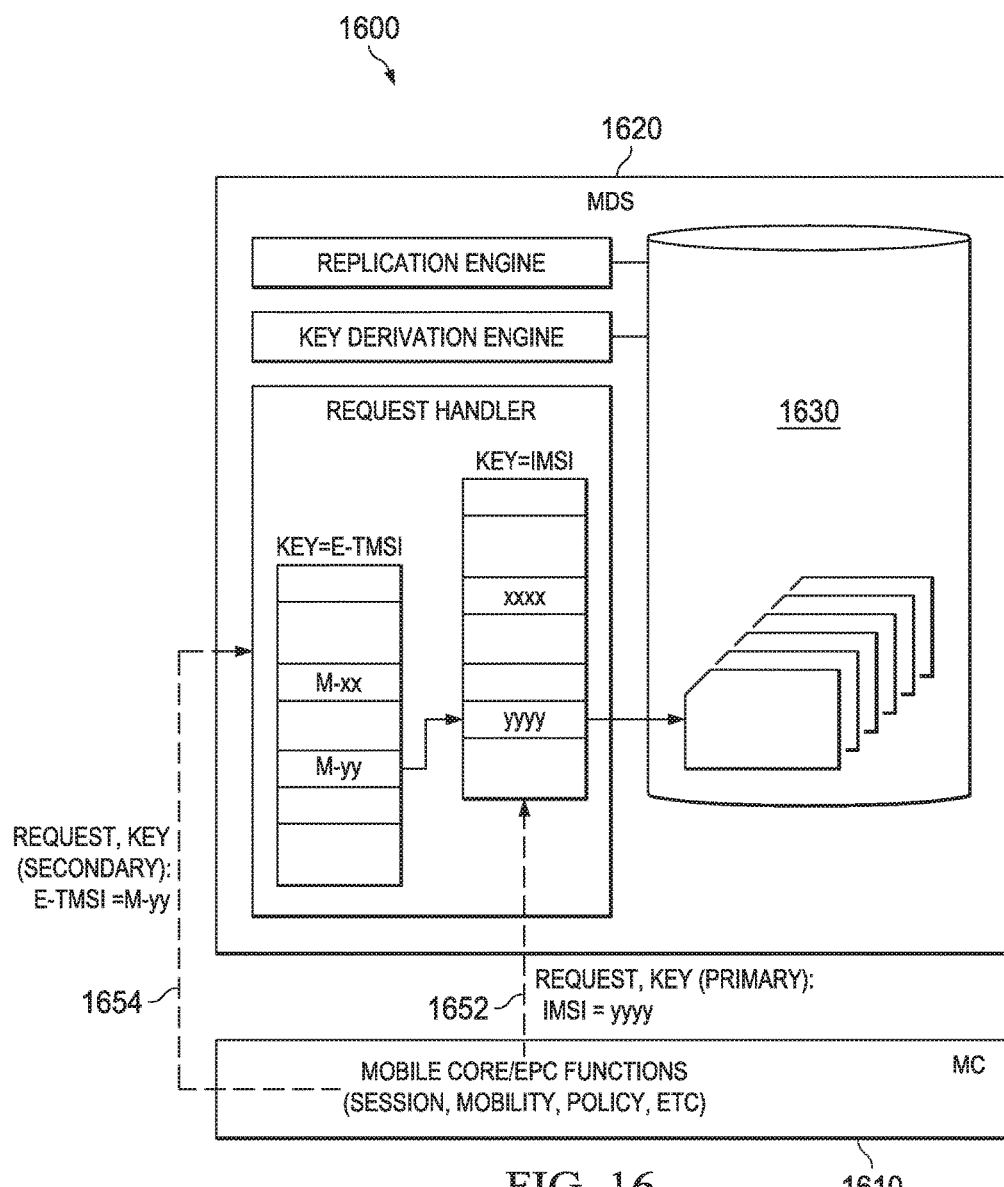
FIG. 16 illustrates a diagram of an embodiment serving network for a UE.

E-TMSI and IMSI are used as keys for accessing user information database. IMSI is the primary key and is unique across clusters, and E-TMSI is the secondary key that is unique within a cluster. FIG. 16 illustrates a diagram of an embodiment serving network 1600 where E-TMSI and IMSI are used for handling a UE's session. The serving network 1600 is similar to the serving network 520, 530 or 540 in FIG. 5. As shown, the serving network 1600 includes a MC 1610 providing MC functions and a MDS agent 1620 for replicating and streaming data. The MDS agent 1620 is similar to the local MDS agent 1040 in FIG. 10. To connect a UE with the serving network 1600, the MC 1610 uses the IMSI of the UE as a key to access a user information data store 1630, via a request handler in the MDS agent 1620, for setting up a UE session (as shown by step 1652). After the UE session is established, an E-TMSI is generated as a temporary identity of the UE in a cluster of the serving network 1600. The E-TMSI and the IMSI will be used as keys to access the data store 1630 for signaling during the UE session (as shown by step 1654).

Figure 17:
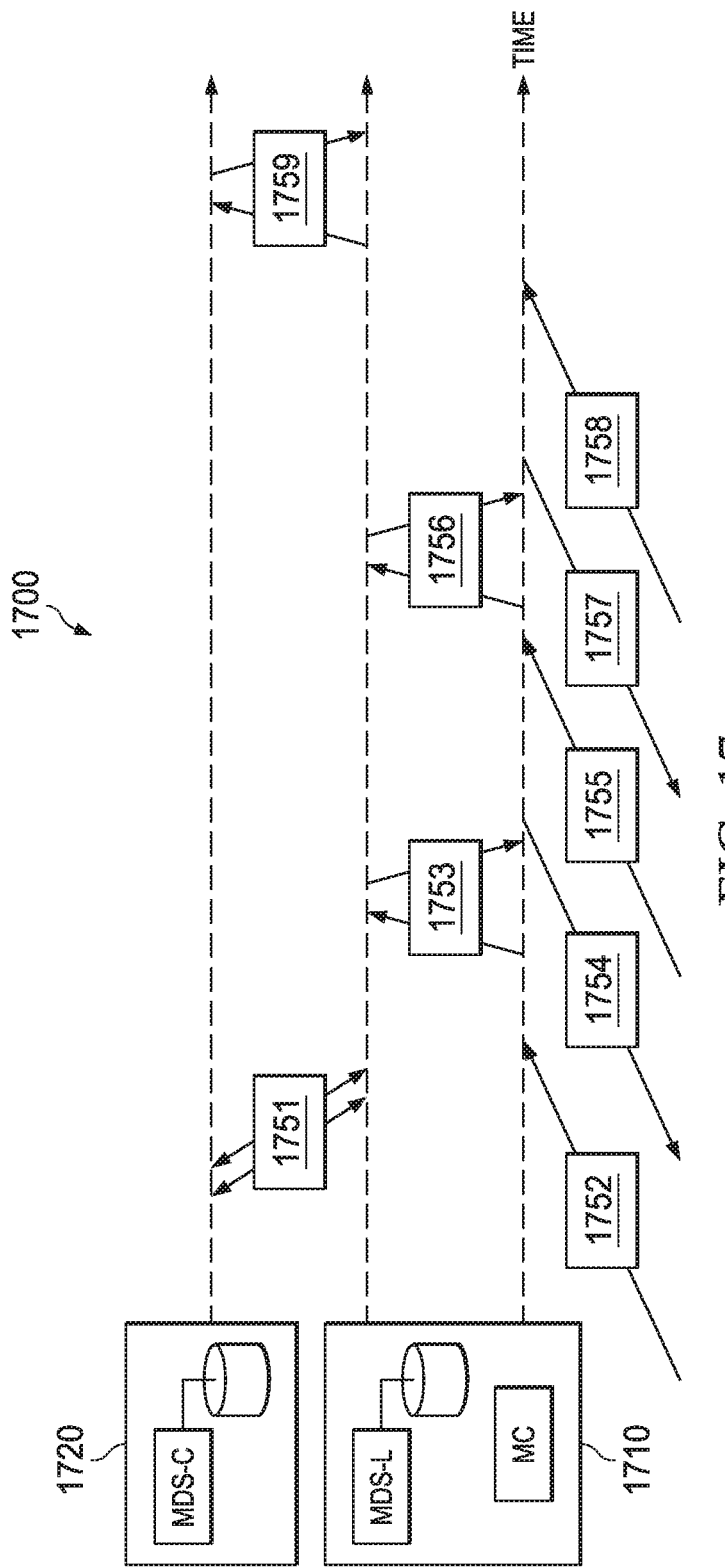
FIG. 17 illustrates a diagram of an embodiment UE attach sequence in a more core network.

FIG. 17 illustrates a diagram of an embodiment attach sequence 1700 that may be used in an attach procedure of a UE in a mobile core network with distributed data services. In this example, a central data center 1720 hosts a central MDS agent (MDS-C), and a distributed data center 1710 hosts a local MDS agent (MDS-L) and a local MC. At step 1751, the MDS-C and the MDS-L discover each other, and the MDS-C replicates subscriber data of UEs to the MDS-L. At step 1752, a UE wishing to connect with the mobile core network sends an attach request together with UE identification information, such as IMSI of the UE. The attach request is sent to the MC at the distributed data center 1710 over a radio access network and/or a backhaul network. Based on the attach request, the MC communicates with the MDS-L for accessing subscriber data of the UE at step 1753 in order to set up a session for the UE. Communications between the MC and the MDS-L may use a request-response mechanism, and example messages communicated may include get-subscriber-data-req (IMSI=imsi, . . . ), subscribe (service=subscriber-data-change; IMSI=imsi), and get-subscriber-data-resp (IMSI=imsi, {[user profile] [sery profile] [chg prof] [dev prof]}). At steps 1754 and 1755, the MC has a sequence of signaling exchanges with the UE, such as messages exchanged regarding identity verification, UE authentication, security setup, attach accept and initial context setup. During the signal exchanges, the MC uses data locally available at the distributed data center 1710, instead of requesting data from the central data center 1720. For example, the MC use an authentication vector derived by the key derivation engine of the MDS-L for user authentication, and ciphered options for security setup are also validated and derived locally at the distributed data center 1710. At step 1756, the MC notifies the MDS-L that updated session context data and metrics data is available when the UE session is set up. The MDS-L may synchronize the updated session context data and metrics data with the MDS-C or other local MDS agents. At step 1757, the MC responds to the attach request, indicating the attached is accepted and initial context is setup. At step 1758, The UE responds to the indication of the MC. At step 1759, the MDS-L streams session context data and metrics data generated during the UE session to the MDS-C. The MDS-L may synchronize the generated session context data and metrics data with a group of MDS agents, including the MDS-C. An example of message for setting the roles of leader and followers for the synchronization may be set-serving-network (IMSI=imsi, leader=@1710, follower=@1720, . . . ).

Figure 18:
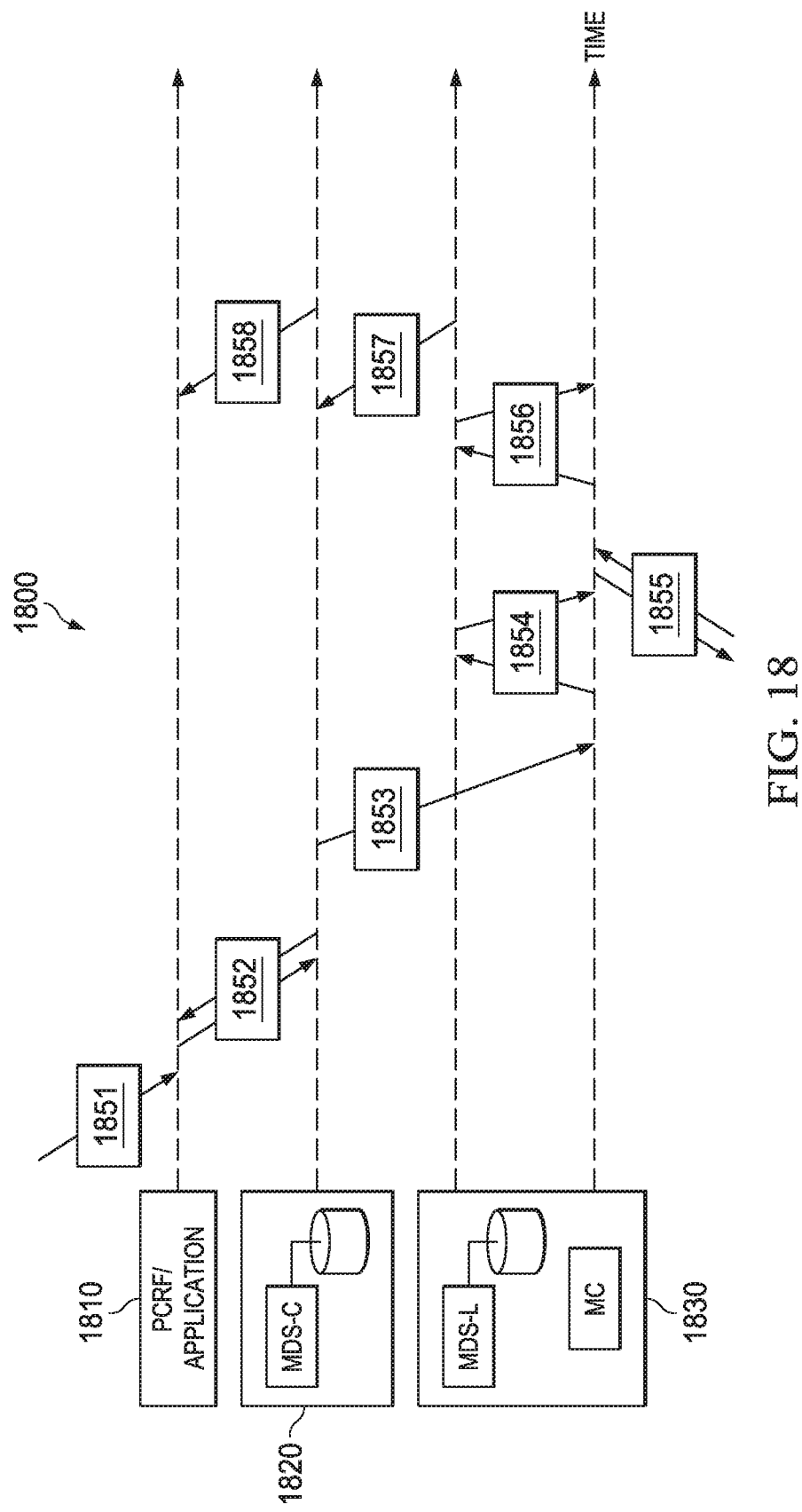
FIG. 18 illustrates a diagram of an embodiment sequence for handling a network application request in a mobile core network.

FIG. 18 illustrates a diagram of an embodiment sequence 1800 that may be used in handling a request from a network application in a mobile core network. In this example, the request requires context information of a UE served by a serving network, such as session context data and/or metrics data. At step 1851, PCRF (or a network application) 1810 receives a diameter AA-request or a request from a service oriented architecture (SOA) based application that needs to locate the serving network for the UE. At step 1852, the PCRF 1810 forwards the request to and exchanges messages with a central MDS agent (MDS-C) at a central data center 1820 for the MDS-C to locate the address of the serving network. The PCRF 1810 may provide information such as subscription data, IP address, and/or session identifiers. Example messages may include get-serving-network-req (IP-address=x, subscrid=imsi, application-id=y), and get-serving-network-ans (serving-id=sn). Steps 1853-1858 process the request and allocate network reserve resources for handling the request in the serving network. At step 1853, the MDS-C determines the address of the serving network based on the serving network identity received and forwards the request to the serving network, i.e., a serving MC at a distributed data center 1830. At step 1854, the serving MC processes the request and obtains information corresponding to the UE, such as IMSI, through a local MDS agent (MDS-L) at the distributed data center 1830. At step 1855, the serving MC communicates with the UE, over a radio access network/backhaul network, to reserve network resources for transmitting the context information of the UE. As the UE's updated context information of the UE is generated, the serving MC notifies the MDS-L of the updated context information at step 1856. At step 1857, the MDS-L synchronizes the updated context information with the MDS-C. For example, the MDS-L streams metrics data of the UE generated during a session of the UE to the MDS-C. The MDS-L may also synchronize the context information with other MDS agents. At step 1858, the MDS-C responds to the request and provides the requested information to the PCRF 1710.

Figure 19:
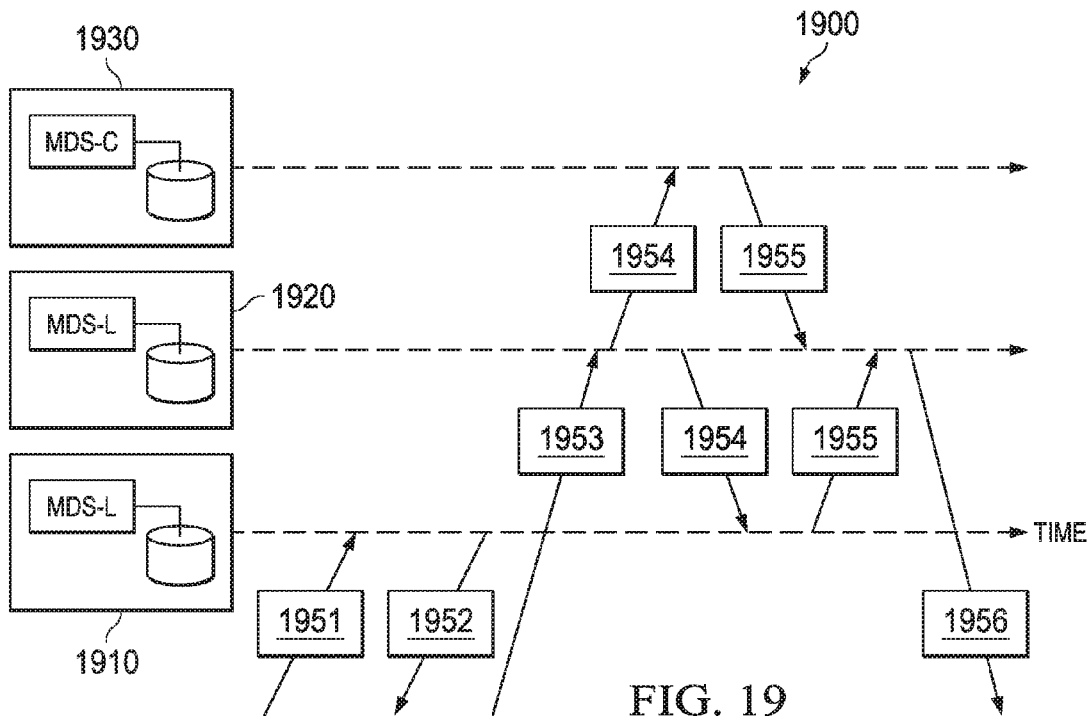
FIG. 19 illustrates a diagram of an embodiment UE handover sequence in a mobile core network.

FIG. 19 illustrates a diagram of an embodiment handover sequence 1900 that may be used in a mobile core network with distributed data services. In this example, the trigger for the handover sequence is a handover request sent by a UE to its serving network which includes a local MDS agent (MDS-L) and a local MC. The serving network processes the handover request and hands the UE over to a target serving network which also includes a local MDS agent (MDS-L) and a local mobile core. The UE's serving network has set up a session for the UE which requires high reliability, and replication of context information of the UE to other serving networks is performed during the session setup procedure.

As shown, steps 1951-19953 are 3GPP messages exchanged for starting a handover. At step 1951, the serving network 1910 receives a handover request, e.g., Handover Required message from the UE, and at step 1952, the serving network 1910 responds with a Handover Command message. At step 1953, the UE sends a Handover Confirm message to a target serving network 1920. Signaling to initiate start relocation procedures may also be sent to the target serving network 1920, and an example of such signaling message includes start-relocation (IMSI=imsi, leader=@1920, follower-@1910, . . . ). If the session context data of the UE has not be synchronized with or replicated to the target serving network 1920, replication exchanges to copy session context date of the UE may be started as well. A set-serving-network message may trigger the replication exchange: set-serving-network (IMSI=imsi, leader=@1910, follower=@1920, . . . ). Serving networks 1910 and 1920 may further coordinate resources allocation for continue to serve the UE. At step 1954, the target serving network 1920 sends signaling for initiating relocation to all members in a serving network cluster including the serving network 1910 and a central data center 1930. An example of such a signaling message may be relocate-session-request (IMSI=imsi, leader=@1920, follower-@1910, . . . ). When the target serving network 1920 receives a quorum of notification from all the members, the target serving network 1920 sends a confirmation message to all the members at step 1955, such as relocate-session-confirm (IMSI=imsi, subscriber-mode=follower; session-mode=follower). At step 1956, the target serving network 1920 sends a 3GPP message for UE context release.

Figure 20:
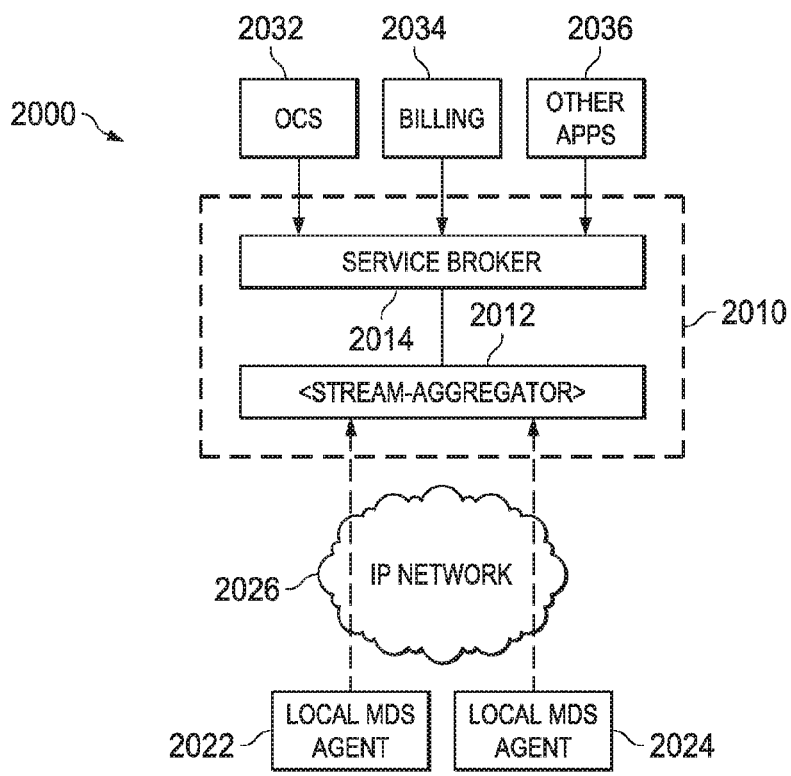
FIG. 20 illustrates a diagram of an embodiment central MDS agent for providing context information to network applications in a mobile core network.

FIG. 20 illustrates a diagram of an embodiment structure 2000 for providing context information to network applications in a mobile core network with distributed data services. In this example, the context information includes subscriber data, session context data and metrics data of UEs. As shown, the structure 2000 includes a central MDS agent 2010 at a central data center (not shown), communicating with local MDS agents 2022 and 2024 at distributed data centers (not shown) over an IP network 2026. The central MDS agent 2010 may include a stream-aggregator 2012 and a service broker 2014. As described above, the central MDS agent 2010 maintains subscriber data of UEs in a central data store and updates the subscriber data with local MDS agents. Session context data and metrics data of a UE may be generated during a session by a serving MC of the UE at a distributed data center, and sent to the central data store through the central MDS agent 2010 and the local MDS agent at the distributed data center. For example, the local MDS agent 2022 or 2024 may stream session context data and metrics data of a UE to the central MDS agent 2010. The stream-aggregator 2012 may be configured to receive the streamed session context data and metrics data, process the received data, and categorize the received data according to requirements of network applications. The stream-aggregator 2012 may be implemented as the replication engine 1024 in FIG. 10. The service broker 2014 may be configured to provide context information subscription services to network entities or applications, such as an online charging system 2032, a billing application 2034, and other applications 2036, and authorize access of the context information by the network entities or applications. The service broker 2014 may serve as an interface for the network entities or applications to access context information stored in the central data store.

Figure 21:
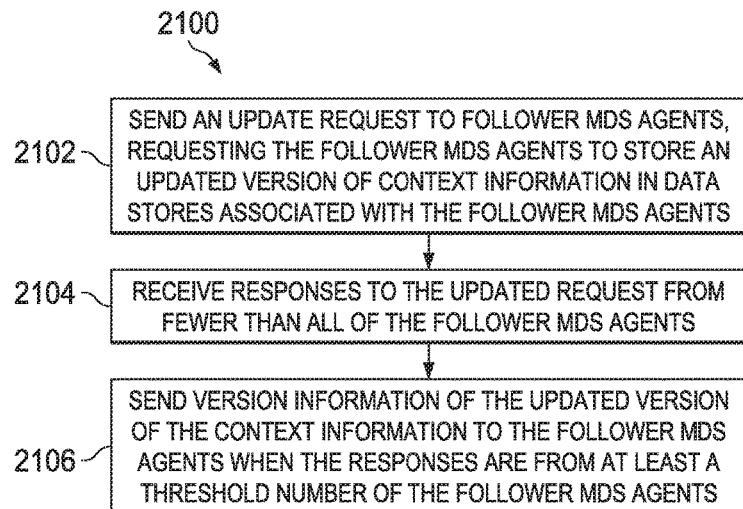
FIG. 21 illustrates a flowchart of an embodiment method for distributed synchronization in a mobile core network.

FIG. 21 illustrates a flowchart of an embodiment method 2100 for distributed synchronization in a mobile core network. At step 2102, a leader MDS agent sends an update request to follower MDS agents, requesting the follower MDS agents to store an updated version of context information in data stores associated with the follower MDS agents. The leader MDS agent and the follower MDS agents may belong to a group of MDS agents at data centers, and the update request may include a copy of the updated version of the context information. At step 2104, the leader MDS agent receives responses to the updated request from fewer than all of the follower MDS agents. At step 2106, the leader MDS agent sends version information of the updated version of the context information to the follower MDS agents when the responses are from at least a threshold number of the follower MDS agents. The version information may trigger the follower MDS agents to update the context information according to the updated version of the context information. In one embodiment, the leader MDS agent is a local MDS agent at a distributed data center. Alternatively, the leader MDS agent is a central MDS agent at a central data center and the follower MDS agents are local MDS agents at distributed data centers. The leader MDS agent may receive an indication before sending the update request, and the indication indicates availability of the updated version of the context information. For example, the leader MDS agent is a local MDS agent at a distributed data center, and receives such an indication from a local MC at the distributed data center. The threshold number of the follower MDS agents may include fewer than all of the follower MDS agents or a majority of the follower MDS agents. The context information may include information corresponding to a session of a user equipment (UE) served by the mobile core network, corresponding to a subscriber record of a UE served by the mobile core network, and/or corresponding to metrics of a session of a UE served by the mobile core network. The follower MDS agents may also include a central MDS agent at a central data center, and the central MDS agent may send the information corresponding to metrics of a UE session to a network application that subscribes to the metrics information.

Figure 22:
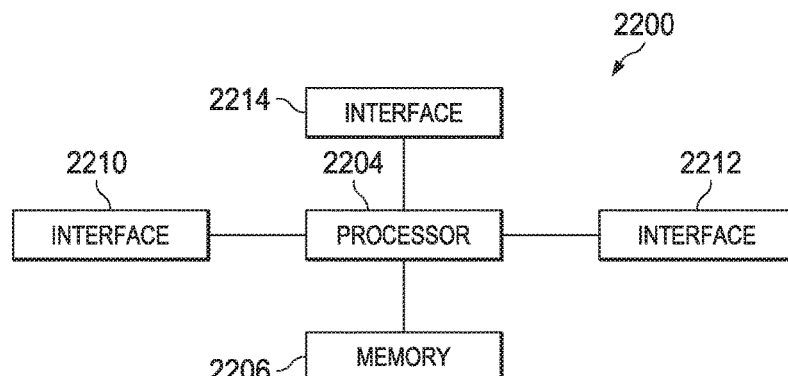
FIG. 22 illustrates a diagram of an embodiment processing system.

FIG. 22 illustrates a block diagram of an embodiment processing system 2200 for performing methods described herein, which may be installed in a host device. As shown, the processing system 2200 includes a processor 2204, a memory 2206, and interfaces 2210-2214, which may (or may not) be arranged as shown in FIG. 22. The processor 2204 may be any component or collection of components adapted to perform computations and/or other processing related tasks, and the memory 2206 may be any component or collection of components adapted to store programming and/or instructions for execution by the processor 2204. In an embodiment, the memory 2206 includes a non-transitory computer readable medium. The interfaces 2210, 2212, 2214 may be any component or collection of components that allow the processing system 2200 to communicate with other devices/components and/or a user. For example, one or more of the interfaces 2210, 2212, 2214 may be adapted to communicate data, control, or management messages from the processor 2204 to applications installed on the host device and/or a remote device. As another example, one or more of the interfaces 2210, 2212, 2214 may be adapted to allow a user or user device (e.g., personal computer (PC), etc.) to interact/communicate with the processing system 2200. The processing system 2200 may include additional components not depicted in FIG. 22, such as long term storage (e.g., non-volatile memory, etc.).

In some embodiments, the processing system 2200 is included in a network device that is accessing, or part otherwise of, a telecommunications network. In one example, the processing system 2200 is in a network-side device in a wireless or wireline telecommunications network, such as a base station, a relay station, a scheduler, a controller, a gateway, a router, an applications server, or any other device in the telecommunications network. In other embodiments, the processing system 2200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 23:
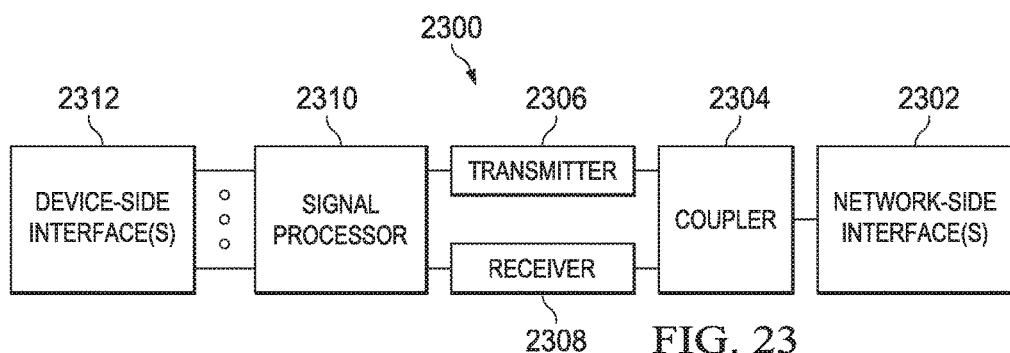
FIG. 23 illustrates a diagram of an embodiment transceiver.

In some embodiments, one or more of the interfaces 2210, 2212, 2214 connects the processing system 2200 to a transceiver adapted to transmit and receive signaling over the telecommunications network. FIG. 23 illustrates a block diagram of a transceiver 2300 adapted to transmit and receive signaling over a telecommunications network. The transceiver 2300 may be installed in a host device. As shown, the transceiver 2300 comprises a network-side interface 2302, a coupler 2304, a transmitter 2306, a receiver 2308, a signal processor 2310, and a device-side interface 2312. The network-side interface 2302 may include any component or collection of components adapted to transmit or receive signaling over a wireless or wireline telecommunications network. The coupler 2304 may include any component or collection of components adapted to facilitate bi-directional communication over the network-side interface 2302. The transmitter 2306 may include any component or collection of components (e.g., up-converter, power amplifier, etc.) adapted to convert a baseband signal into a modulated carrier signal suitable for transmission over the network-side interface 2302. The receiver 2308 may include any component or collection of components (e.g., down-converter, low noise amplifier, etc.) adapted to convert a carrier signal received over the network-side interface 2302 into a baseband signal. The signal processor 2310 may include any component or collection of components adapted to convert a baseband signal into a data signal suitable for communication over the device-side interface(s) 2312, or vice-versa. The device-side interface(s) 2312 may include any component or collection of components adapted to communicate data-signals between the signal processor 2310 and components within the host device (e.g., the processing system 2200, local area network (LAN) ports, etc.).

The transceiver 2300 may transmit and receive signaling over any type of communications medium. In some embodiments, the transceiver 2300 transmits and receives signaling over a wireless medium. For example, the transceiver 2300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2302 comprises one or more antenna/radiating elements. For example, the network-side interface 2302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for distributed synchronization in a mobile core network, the method comprising:
   receiving, by a leader mobile core data service (MDS) agent from a mobile core control (MCC) entity, a message comprising an indication indicating that an updated version of context information is available for synchronization with follower MDS agents, the leader MDS agent and the follower MDS agents belonging to a group of MDS agents at data centers; and
   replicating the updated version of the context information to the follower MDS agents, upon receipt of the message from the MCC entity, wherein replicating the updated version of context information further comprises:
   sending an update request by the leader MDS agent to the follower MDS agents for synchronizing the updated version of the context information with the follower MDS agents; and
   sending version information of the updated version of the context information to the follower MDS agents upon receiving responses from at least a threshold number of the follower MDS agents in response to the update request, the version information triggering the follower MDS agents to update the context information according to the updated version of the context information.

2. The method of claim 1, wherein the leader MDS agent is a local MDS agent at a distributed data center.

3. The method of claim 1, wherein the MCC entity is located at a local mobile core of the leader MDS agent.

4. The method of claim 1, wherein the context information comprises information corresponding to metrics of a session of a UE served by the mobile core network.

5. The method of claim 1, wherein the context information comprises information generated during execution of a session of a UE served by the mobile core network.

6. The method of claim 1, wherein the follower MDS agents comprise a central MDS agent at a logically centralized data center.

7. The method of claim 1, further comprising:
   retrieving the updated version of the context information upon receipt of the message from the MCC entity.

8. The method of claim 7, wherein the updated version of the context information is a latest version of the context information.

9. The method of claim 1, wherein the threshold number of the follower MDS agents comprise fewer than all of the follower MDS agents or a majority of the follower MDS agents.

10. A first mobile core data service (MDS) agent, comprising:
    a non-transitory memory storage comprising instructions; and
    one or more processors in communication with the memory storage, wherein the one or more processors execute the instructions to:
    receive, from a mobile core control (MCC) entity, a message comprising an indication indicating that an updated version of context information is available for synchronization with a plurality of MDS agents of the first MDS agent in a mobile core network, the first MDS agent and the plurality of MDS agents belonging to a group of MDS agents at data centers; and
    replicate the updated version of the context information to the plurality of MDS agents upon receipt of the message from the MCC entity, wherein the updated version of context information is replicated by:
    sending an update request to the plurality of MDS agents for synchronizing the updated version of the context information with the plurality of MDS agents; and
    sending version information of the updated version of the context information to the plurality of MDS agents upon receiving responses from at least a threshold number of the plurality of MDS agents in response to the update request, the version information triggering the plurality of MDS agents to update the context information according to the updated version of the context information.

11. The first MDS agent of claim 10, wherein the first MDS agent is a local MDS agent at a distributed data center.

12. The first MDS agent of claim 10, wherein the MCC entity is located at a local mobile core of the first MDS agent.

13. The first MDS agent of claim 10, wherein the context information comprises information corresponding to metrics of a session of a UE served by the mobile core network.

14. The first MDS agent of claim 10, wherein the context information comprises information generated during execution of a session of a UE served by the mobile core network.

15. The first MDS agent of claim 10, wherein the plurality of MDS agents comprise a central MDS agent at a logically centralized data center.

16. The first MDS agent of claim 10, wherein the one or more processors execute the instructions to further:
    retrieve the updated version of the context information upon receipt of the message from the MCC entity.

17. The first MDS agent of claim 16, wherein the updated version of the context information is a latest version of the context information.

18. The first MDS agent of claim 10, wherein the threshold number of the plurality of MDS agents comprise fewer than all of the plurality of MDS agents or a majority of the plurality of MDS agents.

* * * * *